(12) United States Patent
Estes et al.

(10) Patent No.: US 10,116,394 B2
(45) Date of Patent: Oct. 30, 2018

(54) OPTICAL PAIRING

(71) Applicant: Solpad, Inc., Mountain View, CA (US)

(72) Inventors: Christopher A. Estes, Mountain View, CA (US); Jeffrey Stuart Urban, Mountain View, CA (US)

( * ) Notice: Subject to any disclaimer, the term of this patent is extended or adjusted under 35 U.S.C. 154(b) by 0 days.

(21) Appl. No.: 15/270,886

(22) Filed: Sep. 20, 2016

(65) Prior Publication Data

US 2017/0012711 A1 Jan. 12, 2017

Related U.S. Application Data

(63) Continuation-in-part of application No. 15/260,477, filed on Sep. 9, 2016, now abandoned, which is a
(Continued)

(51) Int. Cl.
| | |
|---|---|
| G08C 23/04 | (2006.01) |
| H04W 12/06 | (2009.01) |
| H02J 3/46 | (2006.01) |
| H02J 9/06 | (2006.01) |
| H02S 40/38 | (2014.01) |
| H02S 40/30 | (2014.01) |
| H02S 40/36 | (2014.01) |
| H04B 10/60 | (2013.01) |
| H04B 10/54 | (2013.01) |
| H04B 10/114 | (2013.01) |

(Continued)

(52) U.S. Cl.
CPC ........... *H04B 10/541* (2013.01); *G08C 23/04* (2013.01); *H01L 31/02021* (2013.01); *H02J 3/383* (2013.01); *H02J 3/46* (2013.01); *H02J 9/06* (2013.01); *H02S 40/30* (2014.12); *H02S 40/36* (2014.12); *H02S 40/38* (2014.12); *H04B 10/1141* (2013.01); *H04W 12/06* (2013.01); *H04B 10/60* (2013.01); *Y02E 10/563* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0062770 | A1* | 3/2010 | Flynn | H04W 88/04 455/436 |
| 2012/0148260 | A1* | 6/2012 | Akiyama | H04B 10/505 398/184 |
| 2013/0126713 | A1* | 5/2013 | Haas | H04B 10/116 250/208.2 |

* cited by examiner

*Primary Examiner* — David Payne
*Assistant Examiner* — Omar S Ismail

(57) ABSTRACT

Disclosed systems and methods transmit and receive data encoded as optical signals that include a progression of symbols, with each symbol represented as a combination of light frequencies. Light is used as the carrier medium to limit reception to devices that are within visible range of the transmitting device. No mapping of data to symbols is required for generation of the symbol progression by the transmitter and no mapping of symbols to data for recognition of the symbols is required by the receiver. Disclosed embodiments allow arbitrary selection among a plurality of mappings between symbols sent and symbols received. Embodiments are robust to: ambient lighting conditions, differences in optical and temporal response of the first and second devices, and differences in relative orientation between the first and second devices. Embodiments enable a variety of functions including device discovery, feature discovery, beacon identification, status reporting, error readout, key exchange, and authentication.

12 Claims, 16 Drawing Sheets

Related U.S. Application Data continuation of application No. 13/843,573, filed on Mar. 15, 2013, now Pat. No. 9,444,397.

(60) Provisional application No. 61/719,140, filed on Oct. 26, 2012.

(51) Int. Cl.
*H01L 31/02* (2006.01)
*H02J 3/38* (2006.01)

| COLOR | DATA SYMBOL |
|-------|-------------|
| RED | 0 |
| GREEN | 1 |
| BLUE | 2 |

| COLOR | DATA SYMBOL |
|---|---|
| ORANGE | 0 |
| YELLOW | 1 |
| GREEN | 2 |
| BLUE | 3 |
| INDIGO | 4 |

OPTICAL PAIRING

CROSS-REFERENCE TO RELATED APPLICATIONS

This application claims benefit of co-pending U.S. patent application Ser. No. 15/260,477 filed Sep. 9, 2016 which is a continuation application of U.S. patent application Ser. No. 13/843,573 filed Mar. 15, 2013 and issued as U.S. Pat. No. 9,444,397 on Sep. 13, 2016, and claims the benefit of U.S. Provisional Patent Appl. No. 61/719,140, filed Oct. 26, 2012, which is incorporated herein by reference in its entirety.

FIELD OF THE INVENTION

The disclosed invention generally relates to data transfer between computing devices and in particular to transfer of data encoded as optical signals.

BACKGROUND OF THE INVENTION

Communication between two or more computing devices generally requires an initialization procedure. For example, in order for two devices to communicate using WiFi or Bluetooth™, a pairing operation must be performed. Generally the pairing operation is a process in which security credentials are transmitted from one device to another. With Bluetooth™ pairing, for example, a passkey must be exchanged confirming that the two devices are authorized to exchange data. Two devices to be paired generally send and receive signals to communicate the presence of each device to the other device and to exchange security credentials. Data may be securely transmitted (e.g., using data encryption) between the devices once two devices have been paired. Conventional pairing operations generally are performed using radio frequency (RF) electromagnetic signals which may be intercepted by malicious third parties. As such, conventional pairing procedures may leave the devices engaged in the pairing operation open to attack thereby compromising the security of data transfer.

Most communication methods are based on a mapping of data to symbols, a mapping between symbols sent and symbols received, and a mapping of symbols received back to data. These require compromises that limit compatibility between transmitting and receiving devices and reduced robustness of signal communication in the presence of unrelated in-band signals.

A large number of internet-of-things devices and mobile accessories have limited capabilities for communication, and these capabilities may not be initially configured and may later become disabled or compromised. Users desire a simple and intuitive means to identify these devices, identify their locations, create links between these devices and their mobile devices (e.g., computer, tablet, phone), and to receive troubleshooting information. Product industrial designers and manufacturing engineers seek to implement more elegant designs that do not require unique per-unit identifying labels. Security engineers wish to avoid consistent or easily reverse-engineered identifying values. User experience designers seek to avoid awkward processes that require manual entry of identification values, or capture of more complicated graphical codes. The primary user interface for these devices is often implemented on a mobile device with varying hardware and imaging capabilities that is not known in advance by the device manufacturer. Reliable robust and intuitive, localized communication from the device to a heterogeneous population of mobile devices is lacking.

SUMMARY OF THE INVENTION

Disclosed embodiments enable transmission of a progression of combinations of light frequencies as a medium to provide communication of data from one device to another device. A variety of functions are enabled including device discovery, feature discovery, beacon identification, status reporting, error readout, key exchange, and authentication. Each symbol may be a combination of frequencies, rather than a single frequency. Frequencies may include the typical red, green and blue for visible indications from discrete LEDs and raster displays, but may also include CMYK and/or the addition of infra-red or ultraviolet light elements.

A transmitting device may include a discrete or raster display light emitting element or similar optical transmitter and a receiving device (e.g., a laptop, tablet, smartphone, etc.), may include a camera or other color sensor.

The disclosed embodiments provide a solution to the above-referenced deficiencies of conventional systems by enabling communications to be performed using optical signals. Optical signals are transmitted and received in a line-of-sight fashion, and cannot be intercepted as easily as (RF) electromagnetic signals, for example, that may transmit through walls. Using optical pairing, a would-be attacker would need to be physically present in the same room with the devices to be paired and would have to have line-of-sight access to the optical signals. Thus, the disclosed embodiments enable pairing to be performed with a much higher degree of security relative to conventional pairing operations that are based on the exchange of RF signals.

According to an embodiment, a processor based method of transmitting data that is encoded as an optical signal is disclosed. The method includes using a processor on a first device to encode a progression of data symbols as an optical signal, with the progression of data symbols representing a security authentication code that establishes a secure data transfer connection between the first device and a second device. The method further includes generating the optical signal on the first device and transmitting it to the second device.

In a further embodiment, the method includes encoding the progression of data symbols by mapping a plurality of data symbols from the progression to a corresponding plurality of optical frequencies. The optical signal is then generated and transmitted as a frequency modulated optical signal including the plurality of optical frequencies, with each frequency lasting for a predetermined time duration and with the progression of frequencies in the optical signal corresponding to the progression of data symbols.

According to an embodiment, a system that transmits data encoded as an optical signal is disclosed. The system includes a processor and an optical signal generator. A processor on a first device encodes a progression of data symbols as an optical signal, with the progression of data symbols representing a security authentication code that establishes a secure data transfer connection between the first device and a second device. An optical signal generator on the first device generates the optical signal and transmits it to the second device.

In a further embodiment, the processor may be further configured to encode the progression of data symbols by mapping a plurality of data symbols from the progression to a corresponding plurality of optical frequencies. Further, the optical signal generator may be further configured to generate and transmit the optical signal as a frequency modulated optical signal including the plurality of optical frequencies, with each frequency lasting for a predetermined time duration and with the progression of frequencies in the optical signal corresponding to the progression of data symbols.

According to an embodiment, a processor based method of receiving data that is encoded as an optical signal is disclosed. The method includes receiving an optical signal at a first device and using a processor on the first device to decode a progression of data symbols from the optical signal. The method further includes using the processor on the first device to determine that the progression of symbols represents a security authentication code that establishes a secure data transfer connection between the first device and a second device.

In a further embodiment, the method includes receiving the optical signal as a frequency modulated optical signal including a plurality of optical frequencies with each frequency lasting for a predetermined time duration and with the progression of frequencies in the optical signal corresponding to the progression of data symbols. The method further includes decoding the progression of data symbols by mapping a plurality of optical frequencies to a corresponding plurality of data symbols.

According to an embodiment, a system that receives data encoded as an optical signal is disclosed. The system includes an optical receiver and a processor. An optical receiver on a first device receives an optical signal. A processor on the first device decodes a progression of data symbols from the optical signal and determines that the progression of data symbols represents a security authentication code that establishes a secure data transfer connection between the first device and a second device.

In a further embodiment, the optical receiver may be further configured to receive the optical signal as a frequency modulated optical signal including a plurality of optical frequencies with each frequency lasting for a predetermined time duration and with the progression of frequencies in the optical signal corresponding to a progression of data symbols. Further, the processor may be configured to decode the progression of data symbols by mapping a plurality of optical frequencies to a corresponding plurality of data symbols.

Further embodiments, features, and advantages, as well as the structure and operation of the various embodiments, are described in detail below with reference to the accompanying drawings.

BRIEF DESCRIPTION OF THE DRAWINGS

Embodiments are described with reference to the accompanying drawings. In the drawings, like reference numbers may indicate identical or functionally similar elements.

Figure 1:
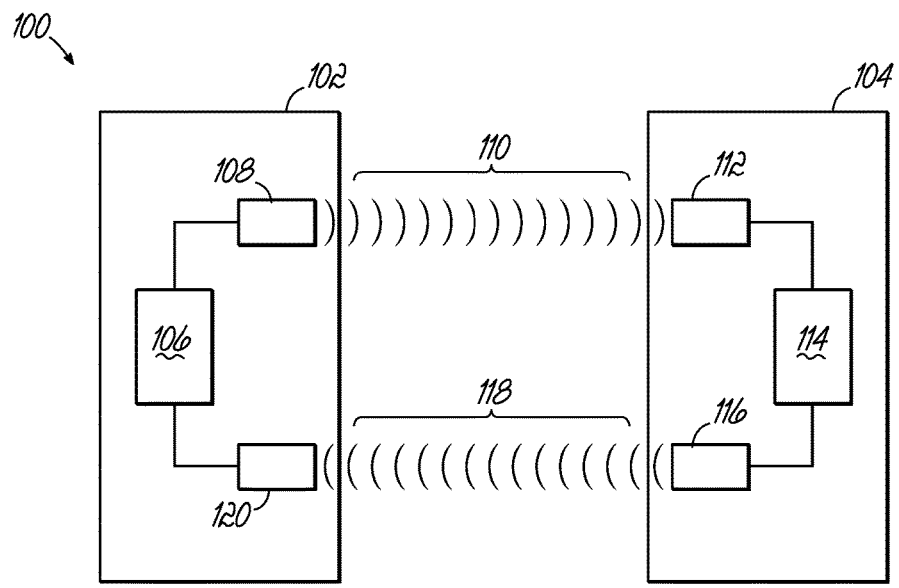
FIG. 1 is a schematic illustration of a system in which a first device transmits data encoded as an optical signal to a second device and receives data encoded as an optical signal from the second device, according to an embodiment.

The disclosed invention is described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION

This disclosure provides systems and methods that transmit and receive data encoded as optical signals.

Reference in this specification to "one embodiment," "an embodiment," an "example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one of ordinary skill in the relevant art to affect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those of ordinary skill in the relevant art with access to the teachings provided herein will recognize additional modifications, applications, and embodiments within the scope thereof and additional fields in which embodiments would be of significant utility. Therefore, the detailed description is not meant to limit the embodiments described below.

Embodiments of the invention may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

FIG. 1 is a schematic illustration of a system 100 in which a first device 102 transmits data encoded as an optical signal to a second device 104 and receives data encoded as an optical signal from the second device 104, according to an embodiment. The first device may include a processor 106 and an optical signal generator 108. For example, the optical signal generator 108 may be a multi-frequency optical generator such as an RGB light emitting diode (LED) or a multi-color raster display. The processor 106 may be configured to encode a progression of data symbols as an analog or digital optical signal 110 that is generated and transmitted by the optical signal generator 108. As described in greater detail below, the optical signal may be generated to encode a sequence of data symbols that represents a security authentication code that establishes a secure data transfer connection between the first device 102 and a second device 104.

The processor 106 may represent the optical signal as an electrical signal that is provided to the optical signal generator 108. The optical signal generator 108 may receive the electrical signal from the processor 106 and, from the electrical signal, generate and transmit the optical signal 110 as a light wave. According to an embodiment, the light wave of the optical signal 110 may be in the visible part of the electromagnetic spectrum. In further embodiments, the light wave may be in the infra-red (IR) or ultra-violate (UV) parts of the electromagnetic spectrum.

The processor 106 of the first device 102 may encode the sequence of data symbols by mapping a plurality of data symbols from the sequence to a corresponding plurality of optical frequencies, as described in greater detail below. Further, the optical signal generator 108 of the first device 102 may generate and transmit the optical signal 110 as a frequency modulated optical signal comprising the plurality of optical frequencies, with the progression of frequencies in the optical signal corresponding to the progression of data symbols as defined by the mapping. According to an embodiment, each frequency may last for a predetermined time duration, as described in greater detail below.

According to an embodiment, the second device 104 may include an optical receiver 112 and a processor 114. The optical receiver 112 may be configured to receive the optical signal 110 and to generate an analog or digital electrical signal from the optical signal 110. The optical receiver 112 may be a multi-color light sensor or a camera. The optical receiver 112 may then provide the electrical signal to the processor 114. According to an embodiment, the processor 114 may then decode a progression of data symbols based on the electrical signal provided by the optical receiver 112. The processor 114 may further determine that the progression of symbols represents a security authentication code that establishes a secure data transfer connection between the first device 102 and a second device 104.

According to an embodiment, the optical receiver 112 of the second device 104 may be configured to receive the optical signal 110 as a frequency modulated optical signal comprising a plurality of optical frequencies, with the progression of frequencies in the optical signal corresponds to a progression of data symbols. According to an embodiment, each frequency may last for a predetermined time duration. Upon receiving the optical signal 110, the optical receiver 112 of the second device 104 may generate an analog or digital electrical signal based on the optical signal 110. The optical receiver 112 may then provide the generated electrical signal to the processor 114 of the second device 104. According to an embodiment, the processor 114 of the second device 104 may be configured to decode the progression of data symbols by mapping a plurality of optical frequencies to a corresponding plurality of data symbols.

The above described embodiments relate to a system 100 in which the first device 102 transmits data encoded as an optical signal 110 to the second device 104 which receives the optical signal 110 and decodes a progression of data symbols from the optical signal 110. As such, the above described embodiments enable one-way communication from the first device 102 to the second device 104. In further embodiments, the second device 104 may include an optical signal generator 116 that may generate and transmit an optical signal 118. Similarly, the first device 102 may include an optical receiver 120 that may be configured to receive the optical signal 118. In this regard, system 100 may be configured to enable two-way communication between the first device 102 and the second device 104.

The processor 114 of the second device 104 may be configured to encode a progression of data symbols as an analog or digital optical signal 118 that is generated and transmitted by the optical signal generator 116. The processor 114 may represent the optical signal as an electrical signal that is provided to the optical signal generator 116. The optical signal generator 116 may receive the electrical signal from the processor 114 and, from the electrical signal, generate and transmit the optical signal 118 as a light wave. According to an embodiment, the light wave of the optical signal 118 may be in the visible part of the electromagnetic spectrum. In further embodiments, the light wave may be in the infra-red (IR) or ultra-violate (UV) parts of the electromagnetic spectrum.

According to an embodiment, the optical receiver 120 of the first device 102 may be configured to receive the optical signal 118 as a frequency modulated optical signal comprising a plurality of optical frequencies, with the progression of frequencies in the optical signal corresponds to a progression of data symbols. According to an embodiment, each frequency may last for a predetermined time duration. Upon receiving the optical signal 118, the optical receiver 120 of the first device 102 may generate an analog or digital electrical signal based on the optical signal 118. The optical receiver 120 may then provide the generated electrical signal to the processor 106 of the first device 102. According to an embodiment, the processor 106 of the first device 102 may be configured to decode the progression of data symbols by mapping a plurality of optical frequencies to a corresponding plurality of data symbols. The processor 106 may further determine that the progression of symbols represents a security authentication code that establishes a secure data transfer connection between the first device 102 and a second device 104.

The above-described embodiments provide one-way or two-way optical communications between computing devices. Example computing devices may include desktop computers, cell phones or smart phones, laptop or notebook computers, game consoles, personal digital assistants ("PDA"), Wii™, data-bracelets, set-top boxes, and other like devices, as would be readily apparent to persons of ordinary skill in the relevant art.

According to an embodiment, one of the devices discussed above with respect to FIG. 1 may be an integrated solar panel. Examples of systems including an integrated solar panel are provided in U.S. Pat. Nos. 9,312,724 and 9,444,397, the disclosures of which are each incorporated by reference herein in their entirety. Systems and methods for transmitting data encoded as an optical signal, as described above with reference to FIG. 1, may be used to establish a secure data transfer connection between an integrated solar panel and one or more additional external devices and/or networks. The following discussion, with reference to FIG. 2, follows similar disclosure found in U.S. Pat. Nos. 9,312,724 and 9,444,397 and provides details regarding wireless communication between an integrated solar panel and other devices/networks.

Figure 2:
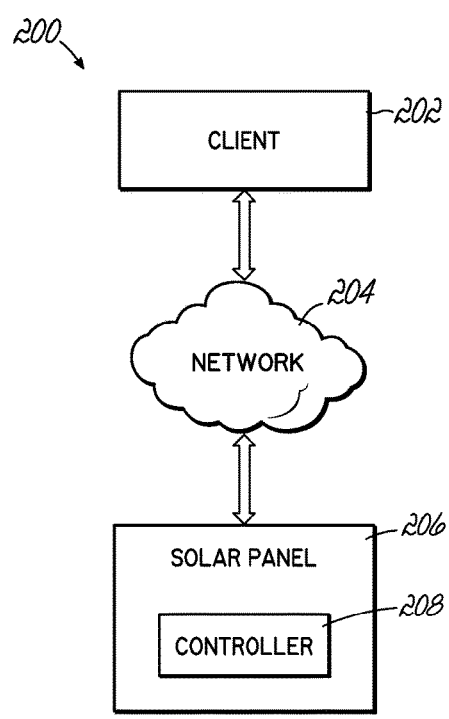
FIG. 2 is a schematic illustration of a wireless solar panel configuration, according to an embodiment.

FIG. 2 is a schematic illustration of a wireless solar panel configuration 200, according to an embodiment. The wireless solar panel configuration 200 includes a client 202, a network 204, and a solar panel 206.

One or more clients 202 may connect to one or more solar panels 206 via network 204. The client 202 may be a device that includes at least one processor, at least one memory, and at least one network interface. For example, the client may be implemented on a personal computer, handheld computer, personal digital assistant, smart phone, a mobile telephone, a game console, a set-top box, and the like.

According to an embodiment, the client 202 may communicate with the solar panel 206 via network 204. Network 204 may include one or more networks, such as the Internet. In some embodiments of the invention, network 204 may include one or more wide area networks (WAN) or local area networks (LAN). Network 204 may utilize one or more network technologies such as Ethernet, Fast Ethernet, Gigabit Ethernet, virtual private network (VPN), remote VPN access, a variant of IEEE 802.11 standard such as Wi-Fi, and the like. Communication over network 204 takes place using one or more network communication protocols including reliable streaming protocols such as transmission control protocol (TCP). These examples are illustrative and not intended to limit the invention.

The solar panel 206 includes a controller 208. The controller 208 may be any type of processing (or computing) device as described above. For example, the controller 208 may be a workstation, mobile device, computer, cluster of computers, set-top box, or other computing device. Such a computing device may include software, firmware, hardware, or a combination thereof. Software may include one or more application on an operating system. Hardware may include, but is not limited to, a processor, memory, and/or graphical user interface display. The memory may be a non-transitory computer readable storage device having computer program instructions stored thereon that, when executed by the processor, cause the processor to perform operations of the controller 206, as described in greater detail below.

According to an embodiment, the client 202 may communicate with the solar panel 206 via network 204 to instruct the solar panel 206 as to the appropriate actions to be taken based on the time of the day. For example, the client 202 may communicate with the solar panel 206 to instruct solar panel 206 to charge its batteries via an input AC power provided by an electrical power grid during times of the day in when sunlight is not acceptable. In another example, the client 202 may communicate with the solar panel 206 via network 204 to instruct the solar panel 206 to operate using DC power provided by internal batteries included in the solar panel 206 during peak utility hours. In such an example, the client 202 may communicate with the solar panel 206 to charge its internal batteries from the solar energy captured by the solar panel 206 during off peak hours while the solar panel 206 relies on input AC power provided by the grid. Client 202 may then communicate with the solar panel 206 to operate using its charged internal batteries during peak hours when the grid is stressed. In another embodiment, the client 202 may communicate with the solar panel 206 via network 204 to receive status updates of the solar panel 206.

In an embodiment, the solar panel 206 may include a Global Positioning System (GPS). The client 202 may communicate with the solar panel 206 via network 204 to adjust alignment of the solar panel 206 so that the solar panel 206 may face the sun at an angle that maximizes the solar energy captured by the solar panel 206. The client 202 may analyze the GPS coordinates of the solar panel 206 provided to the client 202 via the network 204. Based on the GPS coordinates of the solar panel 206 provided to the client 202, the client may adjust the solar panel 206 to face the sun at an angle that maximizes the solar energy captured by the solar panel 206.

In an embodiment, the solar panel 206 may include a tilt mechanism that is built into the back of the solar panel 206. The tilt mechanism may include a stepper motor that adjusts the solar panel 206 at an angle to face the sun that maximizes the solar energy captured by the solar panel 206 as the client 202 adjusts the solar panel 206 based on the GPS coordinates of the solar panel 206.

In an embodiment, the client 202 may remotely control the output AC power of the solar panel 206 via the network 204. The client 202 may reduce the output AC power of the solar panel 206 so that the DC power stored in the battery bank of the solar panel 206 is not depleted.

In an embodiment, the client 202 may obtain information regarding the solar panel 206 via the network 204. The obtained information may include, but is not limited to, energy produced by the solar panel 206, energy consumed by the solar panel 206, the tilt of the solar panel 206, the angle of the solar panel 206, the GPS coordinates of the solar panel 206 and/or any other information regarding the solar panel 206 that may be communicated to the client 202 via the network 204 that will be apparent to those skilled in the relevant art(s) without departing from the spirit and scope of this disclosure. In general, the information may include control data that is used by the controller 208 to control various functions of the integrated solar panel 206. The information may further include status data that reports operating conditions of the integrated solar panel 206.

In further embodiments, the client 202 may communicate directly with the integrated solar panel 206 using wireless or optical channels. When optical channels are used, information may be encoded as an optical signal including a progression of optical frequencies that maps a corresponding progression of data symbols, as discussed above with reference to FIG. 1, and described in further detail below. According to an embodiment, data may be transferred between the integrated solar panel 206 and the client 202 using a progression of data symbols to represent an encrypted message. In further embodiments, encrypted messages may be communicated between the client 202 and the integrated solar panel 206 using WiFi, Bluetooth™, or other wireless channels. In such embodiments, a security authentication code may be communicated between the client 202 and the integrated solar panel 206 using optical signals. Further, the security authentication code may be used to establish a secure data transfer connection between the client 202 and the integrated solar panel 206.

In further embodiments, communication between the client 202 and the network 204 and/or communication between the integrated solar panel 206 and the network 204 may require a secure data transfer connection. In such embodiments, the client 202 and/or the integrated solar panel 206 may supply authentication credentials to the network 204. Such credentials may be in the form of a password, passphrase, or other security authentication code. In certain embodiments, the security credentials may be provided by the client 202 to the integrated solar panel 206 or from the integrated solar panel 206 to the client 202. In such embodiments, the security credentials may be communicated between the client 202 and the integrated solar panel 206 using optical signals, as described in further detail below.

Figure 3:
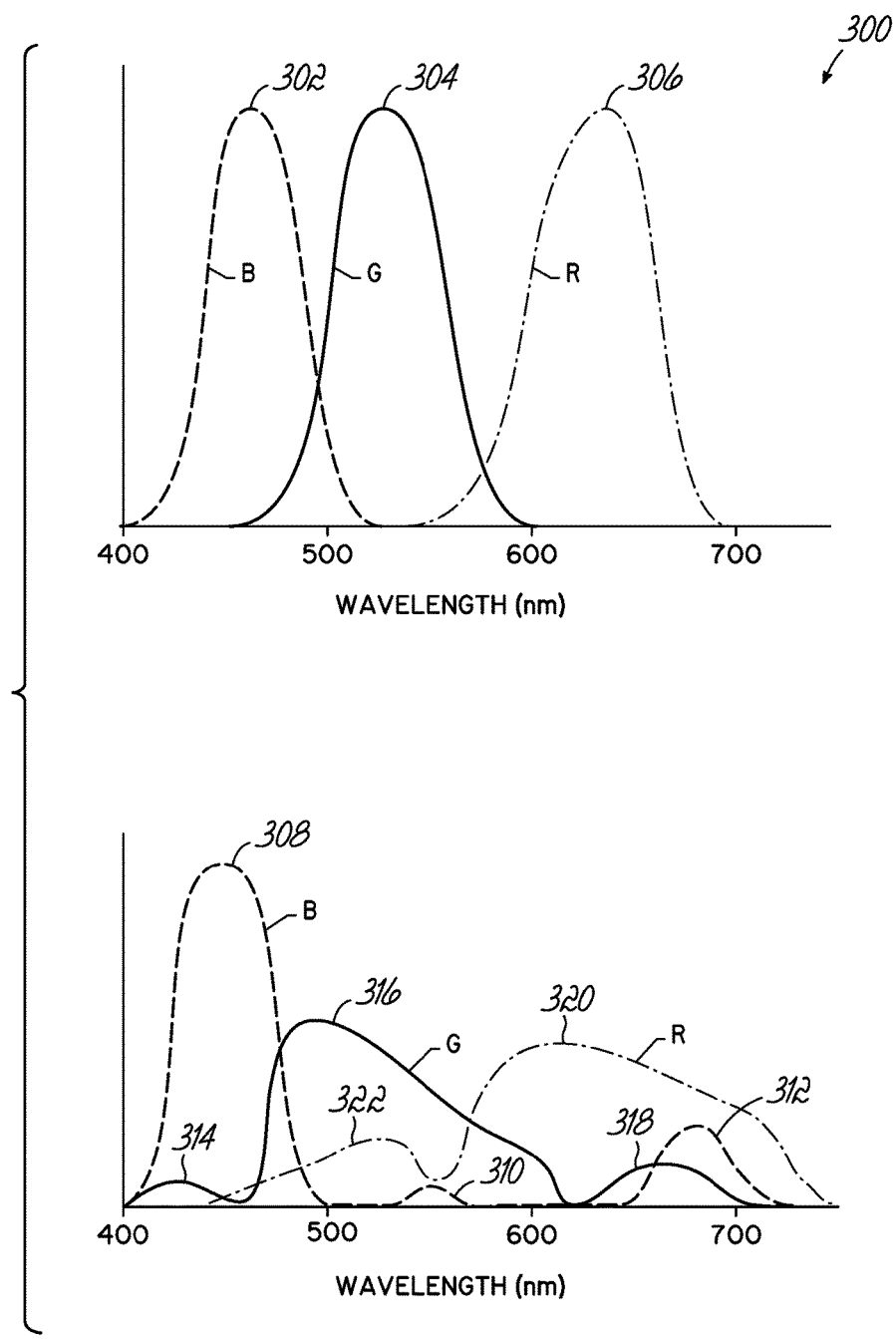
FIG. 3 is a schematic illustration of an example spectral response for an transmitting device and a receiving device, according to an embodiment.

FIG. 3 is a schematic illustration of an example spectral response 300 for an transmitting device and a receiving device, according to an embodiment. The transmitting device may have a spectral response 302 to blue light, a spectral response 304 to green light, and a spectral response 306 to green light. According to various embodiments, the spectral response of the receiving device may be different from the transmitting device. For example, the receiving device may have a spectral response to blue light that has a first portion 308, a second portion 310, and a third portion 312 that differ from the spectral response 302 to blue light of the transmitter. Similarly, the receiver may have a spectral response to green light that has a first portion 314, a second portion 316, a third portion 318 that differ from the spectral response of the transmitter. Similarly the spectral response of the receiver to red light may differ from the spectral response to red light of the transmitter. In this example, the spectral response to red light of the receiver has a first portion 320 and a second portion 322 that differ from the spectral response 306 to red light of the transmitter.

The above-described example refers to an embodiment that includes a three color optical transmitter and a three color optical receiver based on the primary colors, red, green, and blue. Other embodiments may be based on transmitters and receivers that include multiple colors. For example, the transmitter may transmit signals based on an n-color optical source, where n is a positive integer. Similarly, the receiver may be a m-color receiver, where m is a positive integer that may be equal to n (n=m) or may be different from n (n≠m).

The spectral curves for transmitter and receiver presented in FIG. 3 are merely examples. In general the spectral response of a transmitter or receiver is device dependent and the spectral responses of transmitter and receiver generally do not match. The response for each color element on the receiving device (e.g., 308 . . . 322 in FIG. 3) is generally a linear combination of output element spectra and intensities from the first device as filtered by the transmission medium, plus the spectrum of other light that may be present in the environment of the receiving device.

Figure 4:
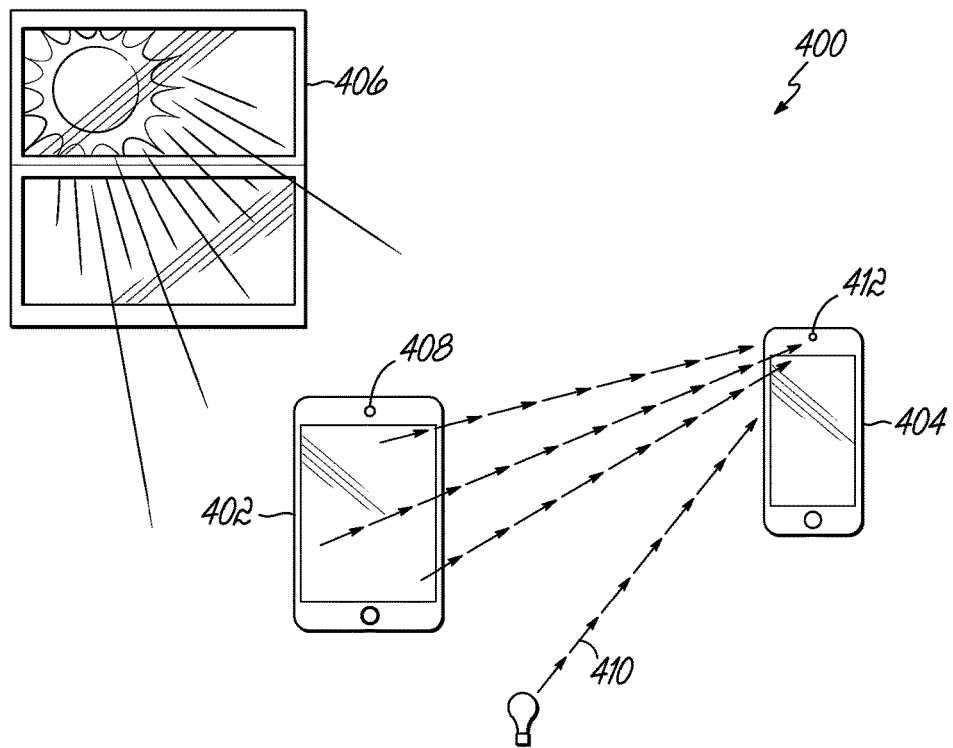
FIG. 4 is a schematic illustration of a transmitting device and a receiving device in the presence of an environment having additional light sources, according to an embodiment.

FIG. 4 is a schematic illustration 400 of a transmitting device 402 and a receiving device 404 in the presence of an environment having additional light sources, according to an embodiment. The first device 402 transmits and optical signal to the second device 404. The signal received by the second device 404, however, differs from the signal transmitted by the first device 402. For example, light from a sunny window 406 may be mixed with the optical signal transmitted by the first device 402. Similarly, light emitted from the first device 402 may differ from light generated by the optical signal generator (e.g., optical transmitter 108 in FIG. 1) because a lens 408 of the transmitting device may be discolored. Light transmitted by the first device 402 may further be mixed by light emitted by another light source 410 such (e.g., from a room lamp). Similarly light received by an optical receiver (e.g., optical receiver 112 of FIG. 1) may differ from the light impinging on the second device 404 due to external characteristics of the receiving device 404. For example, the receiving device 404 may receive light via a camera 412 that may have a colored filter.

Figure 5:
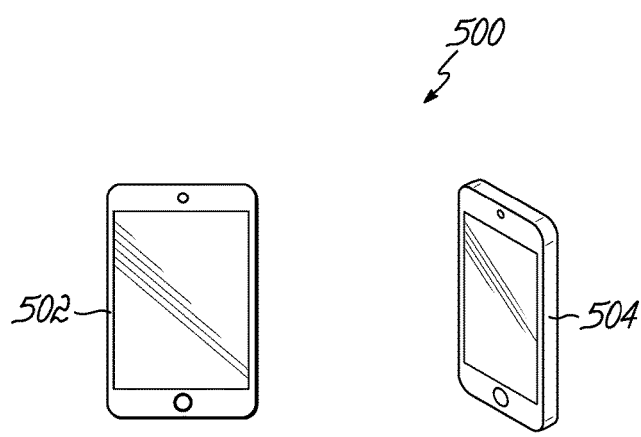
FIG. 5 is a schematic illustration of a configuration in which a transmitter and receiver may not be properly aligned, according to an embodiment.

FIG. 5 is a schematic illustration 500 of a configuration in which a transmitter and receiver may not be properly aligned, according to an embodiment. In this example, a first device 502 may have a first alignment. For example, the first device 502 may be mounted out of reach on a wall or ceiling. Thus the first device 502 may have a fixed alignment. The second device may have an orientation that is poorly aligned with the first device 504. As described in greater detail below, the disclosed embodiments are robust to issues related to alignment and may communicate in situations in which conventional devices may suffer poor performance.

Figure 6:
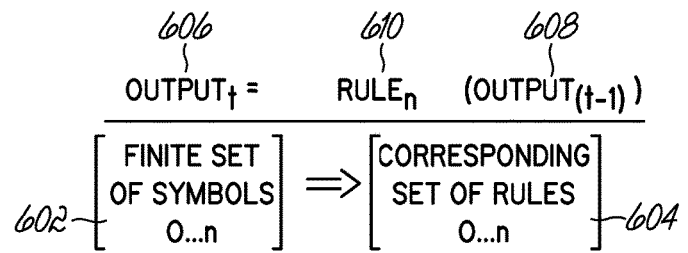
FIG. 6 is a schematic illustration of how a sequence of data symbols may be encoded as a set of rules for modulation of components of an optical signal, according to an embodiment.

FIG. 6 is a schematic illustration of how a sequence of data symbols may be encoded as a set of rules for modulation of components of an optical signal, according to an embodiment. According to an embodiment, data is encoded in an optical signal based on the time dependence of the optical signal. For example, a correspondence between a finite set of data symbols 602 is associated with a corresponding set of rules 604. An optical signal is generated to contain plurality of frequency elements that are each modulated in intensity, with each combination of intensities lasting for a predetermined time duration. The set of rules describes various modulation state transitions of the modulated optical signal. The output 606 at a given time step, t, is related to the output 608 at a previous time step, t–1, by one of the rules 610, as described in greater detail below.

Figure 7:
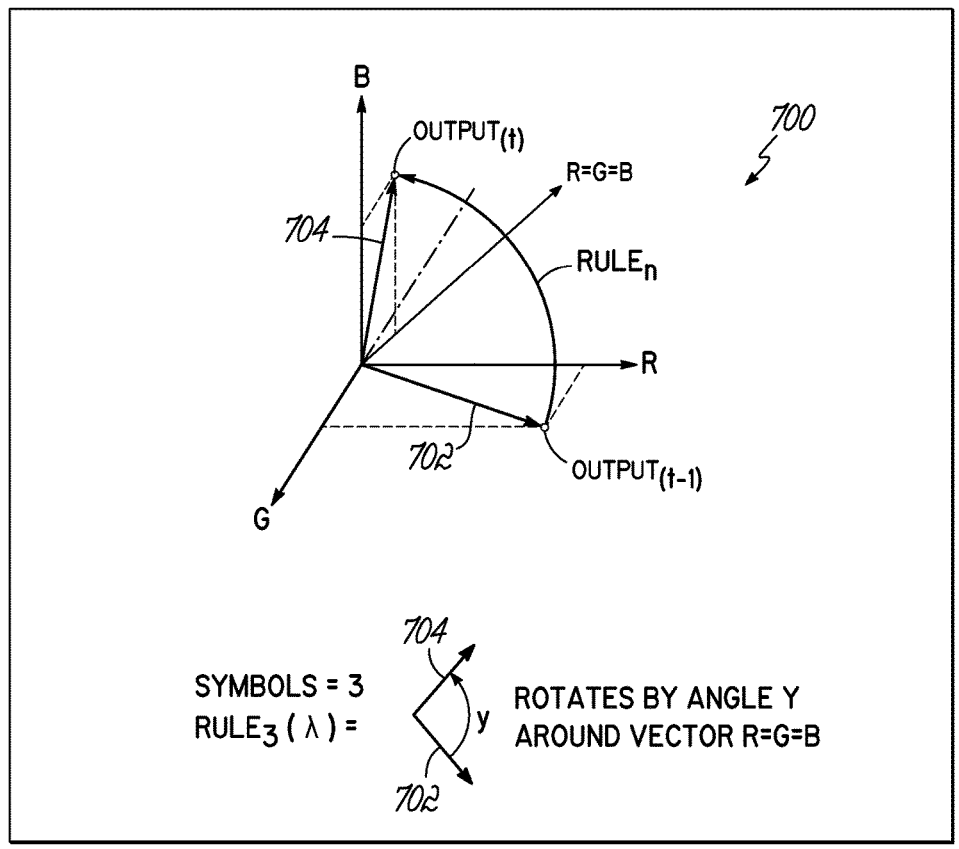
FIG. 7 is a schematic illustration of a rule that is specified in terms of a linear transformation of frequency components of an optical signal, according to an embodiment.

FIG. 7 is a schematic illustration 700 of a rule that is specified in terms of a linear transformation of frequency components of an optical signal, according to an embodiment. In this example, the various frequency components of an optical signal are described as a vector in an n-dimensional color space. For this example, the color space is the 3-dimensional space of colors, red, green, and blue. Thus, at a first time step, t–1, the state of the optical signal may be described by a first vector 702. The optical signal may change to take on a new state at a second time step, t, described by a second vector 704. The specific change from vector 702 to 704 is described by a rule. In this example, the rule (e.g., rule-3) may specify that the vector 702 changes to vector 704 by rotation around the vector R=G=B by an angle "y." Mathematically, the change from vector 702 to 704 is a linear transformation in the R, G, B, 3-dimensional vector space. The value of a symbol (e.g., symbol-3) is encoded in the coefficients of the linear transformation as dictated by the rule (e.g., rule-3).

Figure 8:
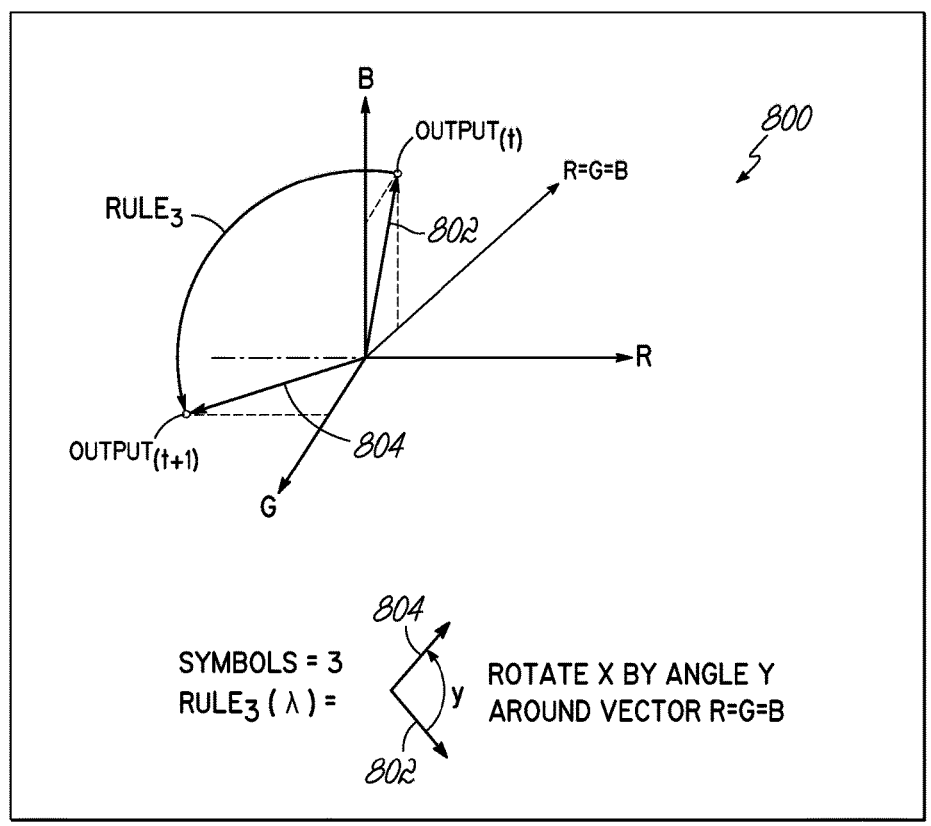
FIG. 8 is a schematic illustration of an example in which the rule of FIG. 7 may be applied to a different starting optical configuration to encode the same symbol, according to an embodiment.

FIG. 8 is a schematic illustration 800 of an example in which the rule of FIG. 7 may be applied to a different starting optical configuration to encode the same symbol, according to an embodiment. For example, a starting configuration of the optical signal may be described by a first vector 802 in the R, G, B color space. This first vector 802 may describe the state of the optical signal at time, t. That is it may coincide with the state 704 described above with reference to FIG. 7. In a further time step, t+1, the optical signal may change to the vector 804. The change from the first vector 802 to the second vector 804 may be described by the same rule (e.g., rule-3) described above with reference to FIG. 7. As such, the change from vector 802 to 804 may, once again, encode the same symbol (e.g., symbol-3). Therefore, the process whereby the optical signal changes from 702 to 704/802 to 804 may thus encode to instantiations of the same symbol (e.g., symbol-3). Thus the processes shown in FIGS. 7-8 may encode the symbol sequence 3, 3. Defining further rules allows further symbols to be encoded, as would be readily appreciated by persons of ordinary skill in the art.

Figure 9:
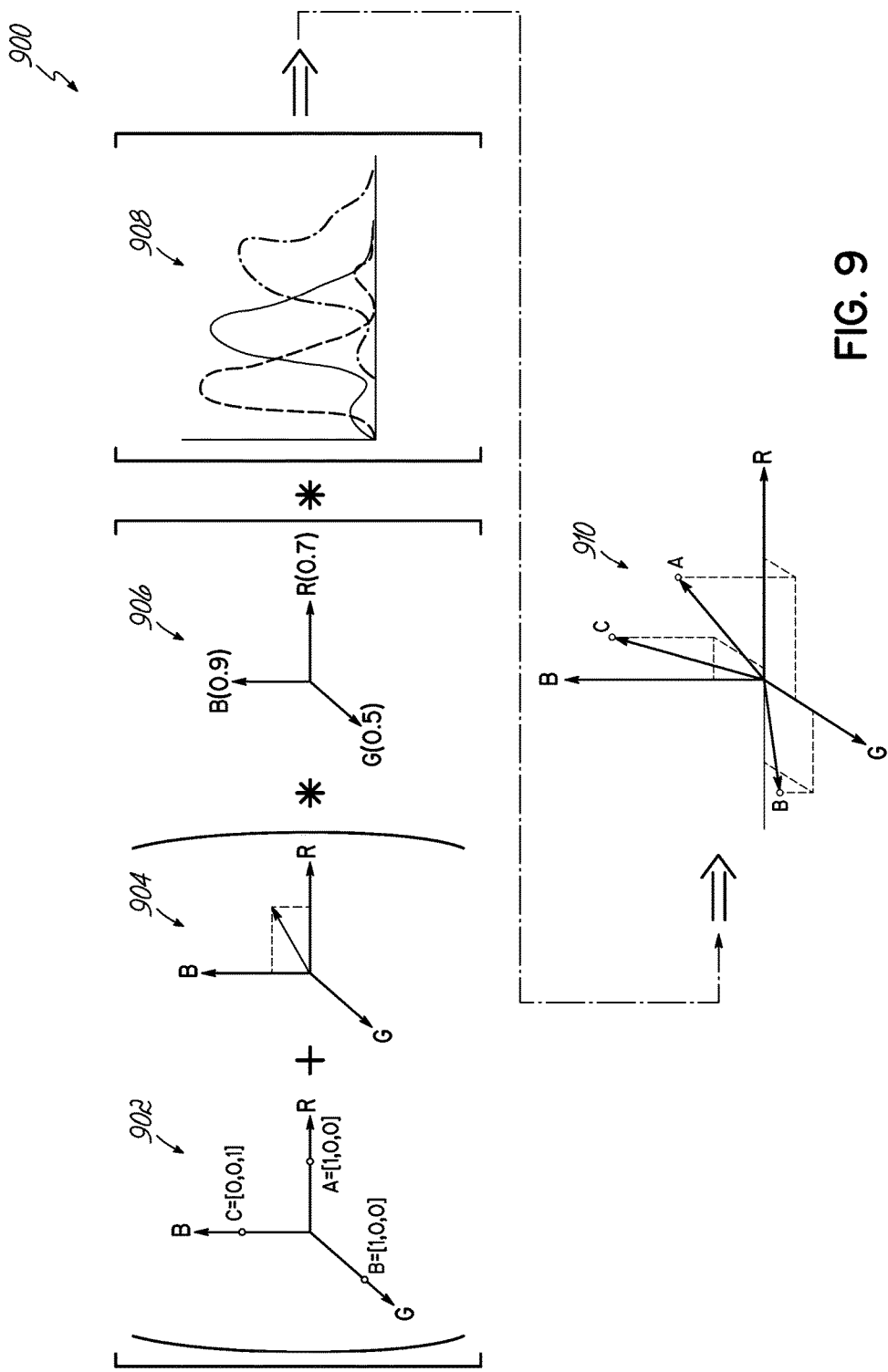
FIG. 9 is a schematic illustration of the process of generating, transmitting, and receiving an optical signal, according to an embodiment.

FIG. 9 is a schematic illustration 900 of the process of generating, transmitting, and receiving an optical signal, according to an embodiment. An initial optical signal 902 is generated as a superposition of frequencies having certain intensities. As described above, this initial optical signal 902 may be described as a vector in the 3-dimensional color space. In this example, the initial optical signal contains three components A, B, and C, having equal intensities corresponding to red, green, and blue, respectively. As the signal propagates it is modified by superposition of light components 904 from other light sources. As the optical signal travels through a medium it may become distorted. The distortion may be described mathematically by multiplying each color component by a factor to give the spectrum of the optical signal 910 that is incident on the optical receiver. Thus, the optical signal incident on the receiver can be described by a series of linear transformations 902, 904, 906. In this example, each of components A, B, and C have been modified by transformations 902, 904, 906 to include some non-zero component of red, green, and blue. Thus, the signal that arrives at the receiver 910, in general has different components than the initial signal 902.

The receiver generates an electrical signal in response to the received optical signal based on the optical response 908 of the receiver. In general, the optical response of the receiver may not be known. Thus, in general, it is not possible to map the frequency and intensity of the optical signal that is received to corresponding transmitted values due to environmental effects and lack of knowledge of the transmitter and receiver responses.

Figure 10:
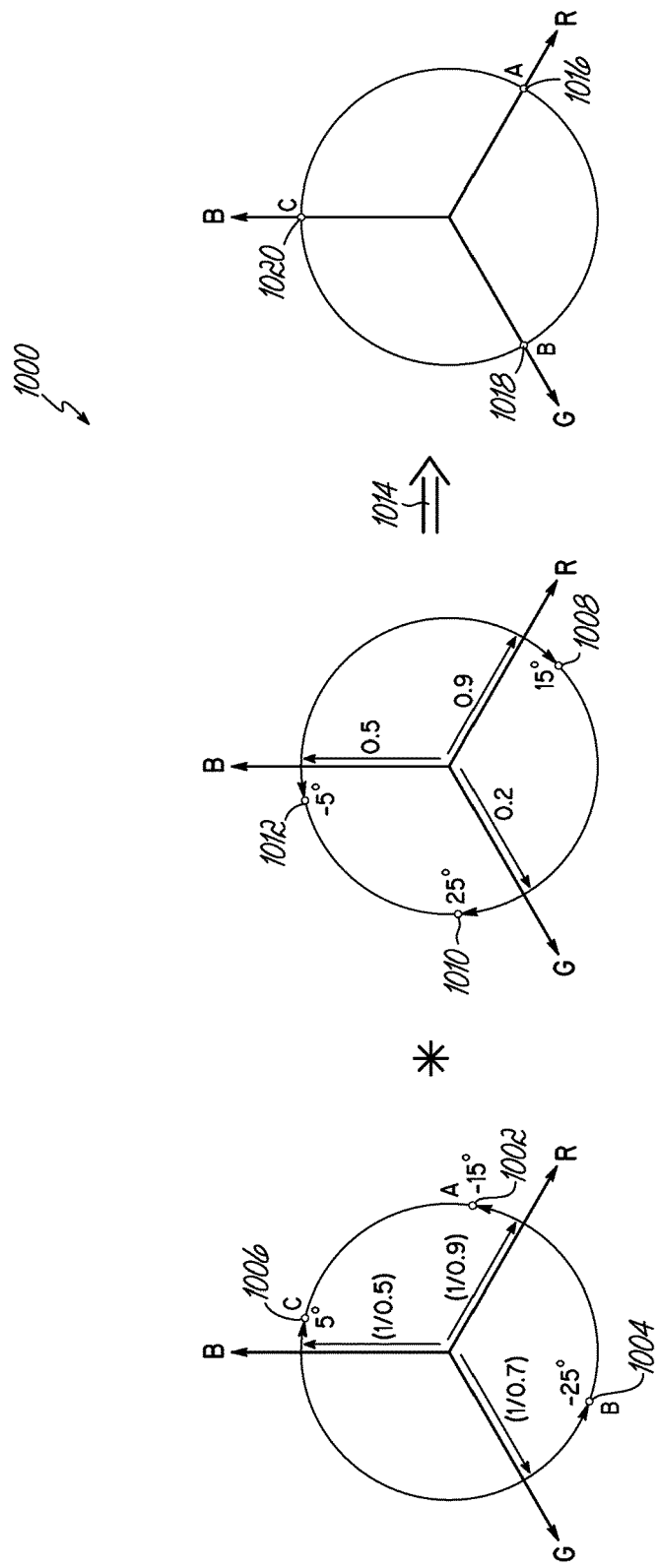
FIG. 10 is a schematic illustration of modulation states of the transmitted and received optical signals, according to an embodiment.

FIG. 10 is a schematic illustration of modulation states of the transmitted and received optical signals, according to an embodiment. Three modulation states A, B, and C are shown for the transmitter as first 1002, second 1004, and third 1006 vectors in the R, G, B, space of the transmitter. As shown in illustration 902 of FIG. 9, the three states A, B, and C, correspond to red, green, and blue. Due to transformations 904 and 906, however, the states A, B, and C, correspond to vectors 1002, 1004, and 1006 that differ from the starting values of red, green, and blue of 902. Similarly, the modulation states of the receiver correspond to different vectors that those shown for the transmitter. For example, the transmission from the transmitter to the receiver may include a transformation described by vectors 1008, 1010, and 1012. According to disclosed embodiments, however, a linear transformation 1014 may correctly identify the intended transmitted optical signal as corresponding to red 1016, green 1018, and blue 1020.

Figure 11:
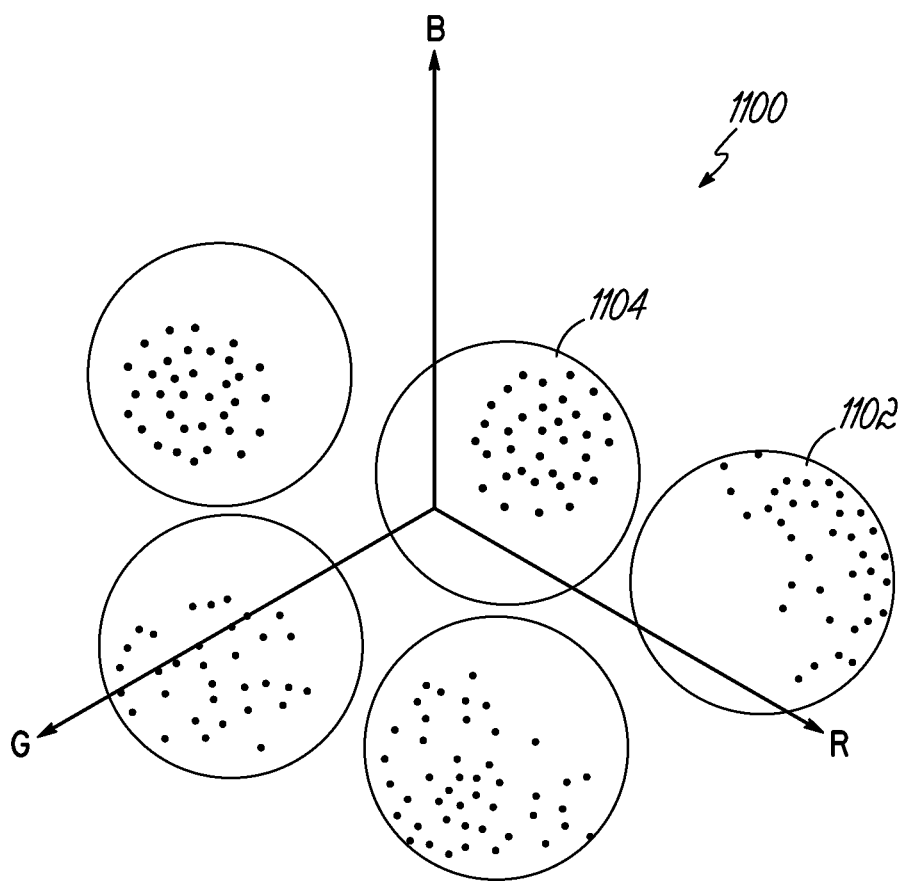
FIG. 11 is a schematic illustration of the use of probabilistic methods to correctly decode symbols from the received optical signal based on detected transitions of the modulated optical signal, according to an embodiment.

FIG. 11 is a schematic illustration 1100 of the use of probabilistic methods to correctly decode symbols from the received optical signal based on detected transitions of the modulated optical signal, according to an embodiment. A data symbol set may be chosen to have a corresponding set of rules, as described above. The rules may be chosen so that symbols may be correctly decoded in accordance to regions in a color space. For example, the receiver may detect the optical signal to have a modulation state described by a vector that falls in a first region 1102. The optical signal may then be found to change so that its modulation state is described by a vector that falls in a second region 1104. As such, probabilistic methods may be used to determine the vector change for vectors changing from region 1102 to 1104. Accordingly a rule may be assigned to the change from region 1102 to 1104 and, as such, the corresponding symbol may be correctly decoded.

According to an embodiment, the use of probabilistic methods may include identifying a population of modulation state transitions by sampling receiver responses for a period of time meeting or exceeding a pre-defined time duration, using the received responses as training data. Further, a sequence of data symbols may be decoded based on a mapping that associates linear transformations applied to a vector within an n-dimensional space of received frequencies and intensities with indexes for an ordered list of the symbols.

Received transformations may be clustered into a set of representative linear transformations based on their proximity in the n-dimensional space. Further, received linear transformations may be clustered into a set of representative linear transformations based on a probabilistic combination of their proximity in the n-dimensional space and their frequency of occurrence within a previous defined sampling time for identifying the population of state transitions. Further, a probabilistic calculation may be updated for both new and previously received linear transformations to include the population of newer linear transformations and to exclude linear transformations older than a defined threshold.

According to an embodiment, a sequence of data symbols may be encoded based on an index into a table of permutation rules expressed as state transitions between sets of light frequencies and corresponding intensities for each frequency. In further embodiments, the sequence of data symbols may be encoded to include symbols, patterns of symbols, or mathematical relationships between consecutive sets of symbols that designate pattern boundaries that enable synchronization of data packets, as described in further detail below. In further embodiments, the sequence of data symbols may be encoded to include symbols, patterns of symbols, or mathematical relationships between consecutive sets of symbols that implement an error detection and/or correction scheme.

According to an embodiment, sets of data symbols and permutation rules may be selected such that a super-pattern containing multiple packets, including a repeated packet, iterates evenly through a space of possible sets of light frequencies and intensities over a defined time duration. In further embodiments, a sequence of data symbols may be encoded based on a mapping that associates indexes for an ordered list of the symbols with linear transformations applied to a vector within an n-dimensional space of frequencies and intensities.

In further embodiments, a sequence of data symbols may be encoded such that the set of linear transformations are maximally distributed within an n-dimensional space of frequencies and intensities that can be transmitted by the first device. As such, the sequence of data symbols may be encoded such that the set of linear transformations from the first device are distributed to maximize the distance between the outcome of corresponding linear transformations in the n-dimensional space representing the set of frequency response curves and intensities that can be sensed by the second device.

According to an embodiment, a set of linear transformations may be defined at a first device based information received from a second device regarding identity, type, and/or relating to a sensor response of the second device. In further embodiments, the information may be received from the second device via a communication channel other than one based on optical signals. In further embodiments, a sequence of data symbols may be encoded to represent an encrypted message, a key, a uniquely identifying value, a feature advertisement, and/or a status message.

For example, the sequence of data symbols may be encoded to represent an authentication code used for multi-factor authentication to initiate secure communications between the first and second devices. In further embodiments, the sequence of data symbols may be encoded to represent a key or hash of a key that is used to initiate secure communications between the first and second devices. In further embodiments, the sequence of data symbols may be encoded to represent a uniquely identifying value for the first device, a feature advertisement for a capability of the first device, and/or a status message relating to a state of the first device.

Figure 12:
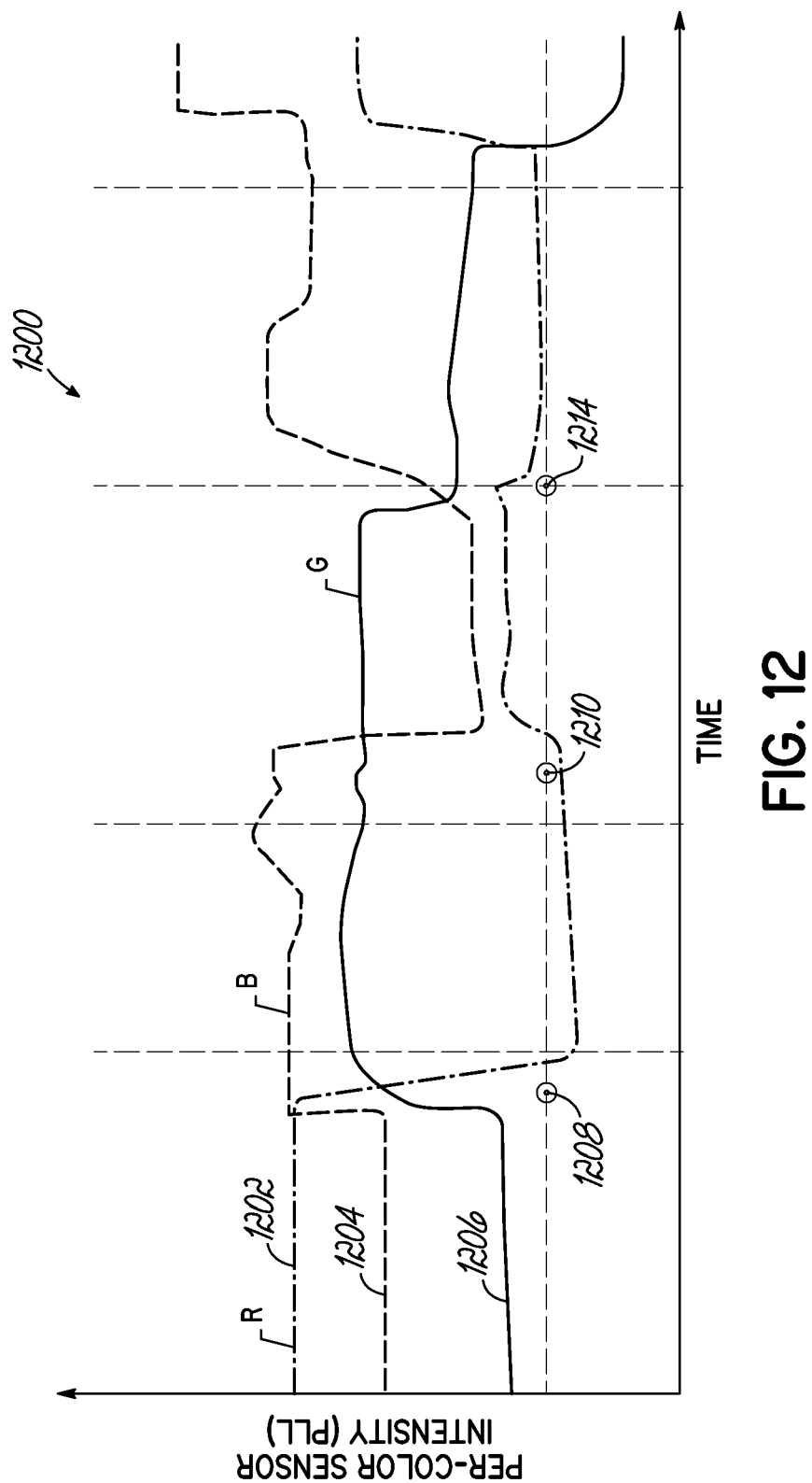
FIG. 12 is a schematic illustration of an optical signal that has been encoding to enable synchronization of data packets, according to an embodiment.

FIG. 12 is a schematic illustration 1200 of a method of sampling an optical signal to determine a clock cycle, according to an embodiment. As shown, the optical signal may have several frequency components. In this example the optical signal has a red component 1202, a blue component 1204, and a green component 1206. Boundaries of symbols and data packets may be determined by sampling the signal and determining changes in the signal. For example, at a first sample 1208 a change in the red signal 1202 may be detected. Based on this change in comparison with the other two color components, it may be determined that the color has changed early. As such, a decision to advance the PLL time may be made. Similarly, at a second sample 1210 it may be determined that the color red has not yet changed. Therefore, a decision to retard the PLL time may be made. At a third sample 1214, it may be determined that the color red has changed at the appropriate time. Therefore, a decision to maintain the PLL time may be made.

In further embodiments, temporal boundaries between linear transformations may be recovered using a digital signal filter to vet linear transformations for significance. In other embodiments, temporal boundaries between linear transformations may be received using a phase locked loop to track periodic timing of significant linear transformations. In further embodiments, a camera or color sensor may be used to capture optical transmission information as linear transformations that occur at a defined temporal periodicity within defined time durations. In further embodiments, significant linear transformations may be recovered using digital filtering of spatial information from the camera or sensor. Digital filtering includes subtracting a white component of an image, applying thresholds to color information, applying weighting factors to emphasize regions of interest, down sampling image data, then extracting mean or median color information.

Figures 13, 14:
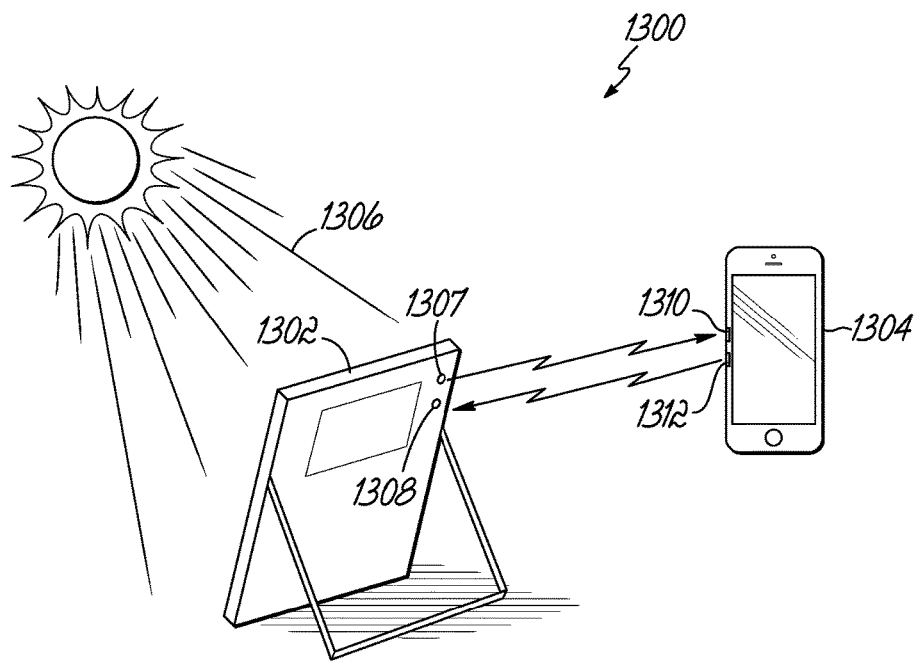
FIG. 13 is a schematic illustration of a system in which an integrated solar panel communicates directly with an external device, according to an embodiment.
FIG. 14 illustrates a mapping between optical frequencies and data symbols that encodes three data symbols, according to an embodiment.

FIG. 13 is a schematic illustration of a system 1300 in which an integrated solar panel 1302 communicates directly with an external device 1304, according to an embodiment. The integrated solar panel 1302 may be a system similar to embodiments described in U.S. Pat. Nos. 9,312,724 and 9,444,397, the disclosures of which are each incorporated by reference herein in their entirety. According to an embodiment, the integrated solar panel 1302 may be portable device that receives solar energy 1306 and converts the received solar energy 1306 to electricity. The external device 1304 may be a personal computer, handheld computer, personal digital assistant, smart phone, a mobile telephone, a game console, a set-top box, and the like.

According to an embodiment, the integrated solar panel 1302 may communicate with the external device 1304 using WiFi, Bluetooth™, or other wireless channels. In further embodiments, integrated solar panel 1302 may communicate with the external device 1304 by sending and receiving optical signals. In this regard, the integrated solar panel 1302 may include an optical signal generator 1306 and an optical receiver 1308. The optical signal generator 1306 may be configured to generate and send an optical signal. The optical receiver 1308 may be configured to receive an optical signal.

Similarly, the external device 1304 may include an optical signal generator 1310 and an optical receiver 1312. The optical signal generator 1310 may be configured to generate and send an optical signal. The optical receiver 1312 may be configured to receive an optical signal. As described in further detail below, optical signals transmitted and received by the integrated solar panel 1302 and external device 1304 may encode a sequence of data symbols by mapping a plurality of data symbols from the sequence to a corresponding plurality of optical frequencies. Further, the sequence of data symbols may represent an encrypted message.

In further embodiments, the sequence of data symbols may represent a security authentication code that establishes a secure data transfer connection between the integrated solar panel 1302 and the external device 1304. For example, the security authentication code that establishes a secure data transfer connection between the integrated solar panel 1302 and the external device 1304 may be a Bluetooth™ passkey. In further embodiments, the security authentication code may establish a secure data transfer connection between the integrated solar panel 1302 and the external device 1304 using other protocols for data transfer using wireless or optical signals.

As described above with respect to FIGS. 6-12, data symbols are encoded in terms of rules describing modulation transitions of the optical signal. In general these rules relate to linear transformations in color spaces. The following discussion with reference to FIGS. 14-18 provides simplified examples in which mappings are defined by associating data symbols with particular colors or with specific color changes. In effect, the following examples consider simple one-dimensional spaces (e.g., three colors mapping to three numbers) for simplicity of discussion with the understanding that, in practice, mappings are based on coefficients of transformations in multi-dimensional color spaces.

FIG. 14 illustrates a mapping 1400 between optical frequencies and data symbols that encodes three data symbols, according to an embodiment. In this example, the mapping 1400 associates each of three frequencies (colors) with a corresponding data symbol. For example, a first data symbol 1402, having a value "0" may be associated with a first frequency 1404 corresponding to the color red. A second data symbol 1406, having a value "1" may be associated with a second frequency 1408 corresponding to the color green. A third symbol 1410, having a value "2" may be associated with a third frequency 1412 corresponding to the color blue. According to an embodiment, a sequence of data symbols may be represented by an optical signal based on the mapping 1400 as described below with reference to FIG. 5.

Figure 15:
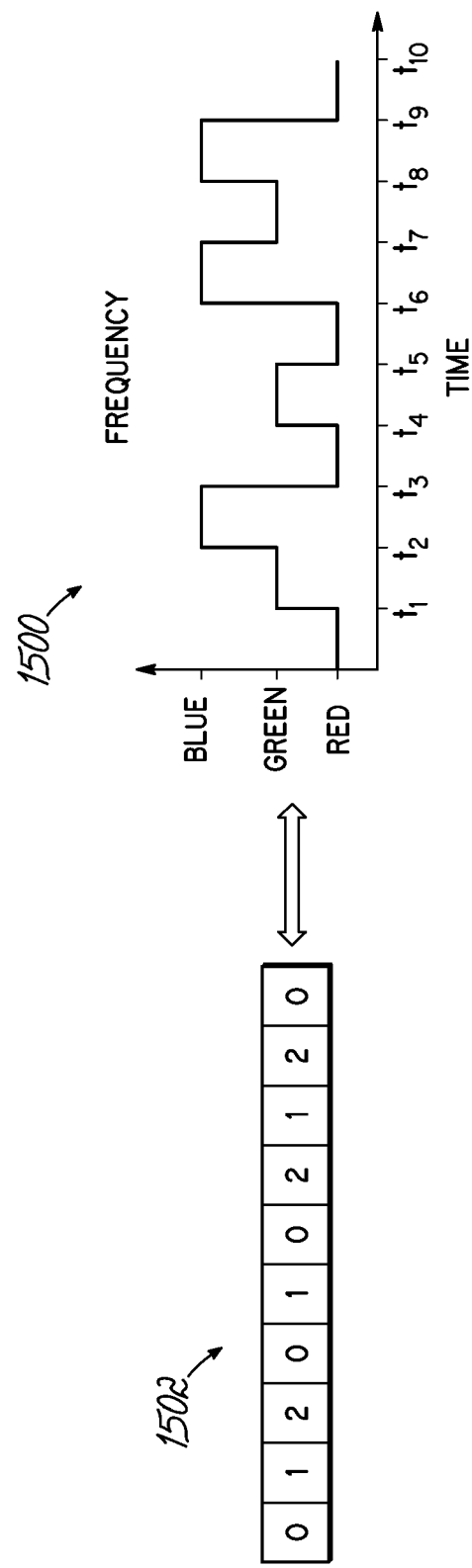
FIG. 15 is schematic illustration of an optical signal that encodes a sequence of data symbols based on the mapping of FIG. 14, according to an embodiment.

FIG. 15 is schematic illustration of an optical signal 1500 that encodes a sequence of data symbols 1502 based on the mapping 1400 of FIG. 14, according to an embodiment. In this example, the sequence of data symbols 1502 is given by the set of values {0, 1, 2, 0, 1, 0, 2, 1, 2, 0}. According to an embodiment, the sequence of data symbols 1502 may be encoded as the optical signal 1500 by associating a frequency (or color) with each data symbol as determined by the mapping 1400 of FIG. 14. Thus, the mapping 1400 of FIG. 14 associates the sequence of data symbols 1502 given by {0, 1, 2, 0, 1, 0, 2, 1, 2, 0} with the corresponding sequence of frequencies (i.e., colors) {red, green, blue, red, green, red, blue, green, blue, red}. According to an embodiment, an optical signal may be generated as a frequency modulated optical signal comprising the plurality of optical frequencies, each frequency lasting for a predetermined time duration, wherein the sequence of frequencies in the optical signal corresponds to the sequence of data symbols as defined by the mapping, as follows.

The optical signal 1500 may be generated to include each color of the sequence {red, green, blue, red, green, red, blue, green, blue, red} for a predetermined time duration. According to an embodiment, the predetermined time duration may be a fraction of a second. For example, the optical signal 1500 includes the color red that is generated and transmitted during the time interval from 0 to $t_1$, the color green from $t_1$ to $t_2$, and the color blue from $t_2$ to $t_3$. As illustrated, the signal continues as: red from $t_3$ to $t_4$, green from $t_4$ to $t_5$, red from $t_5$ to $t_6$, blue from $t_6$ to $t_7$, green from $t_7$ to $t_8$, blue from $t_8$ to $t_9$, and red from $t_9$ to $t_{10}$. In further embodiments, the optical signal 1500 may be received by an optical receiver to generate an electrical signal that is provided to a processor. The processor may then decode the sequence of data symbols 1502 from the received optical signal 1500. In further embodiments, more frequencies may be used to encode data symbols, as described below with reference to FIG. 6.

Figures 16, 17:
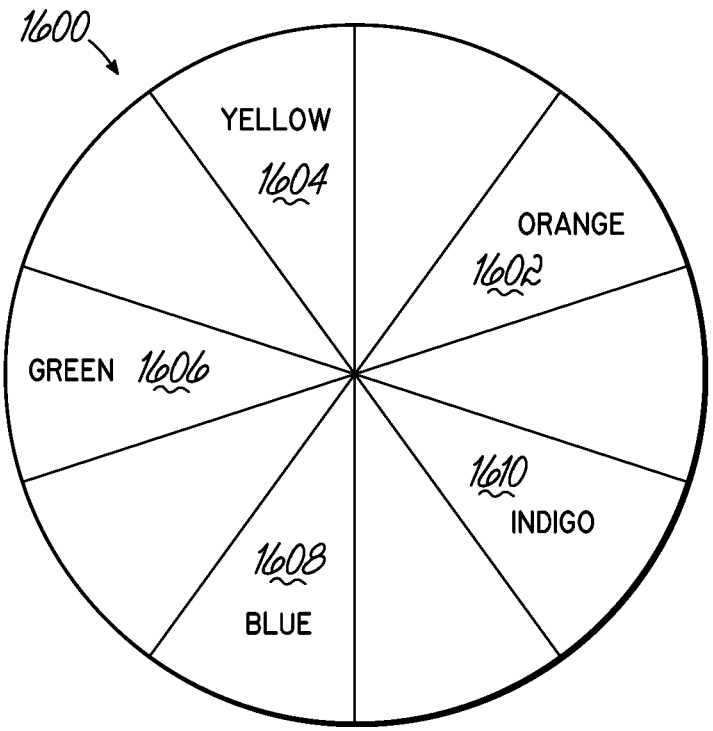
FIG. 16 is a schematic illustration of a two dimensional plane slice through a three dimensional color space, according to an embodiment.
FIG. 17 illustrates a mapping between optical frequencies and data symbols that encodes five data symbols, according to an embodiment.

FIG. 16 is a schematic illustration of a two dimensional plane slice 1600 through a three dimensional color space, according to an embodiment. The plane slice 1600 in the three dimensional color space corresponds to a conventional color wheel. A subset of the full spectrum of colors may be associated with a two dimensional coordinate in the plane slice 1600. A two dimensional coordinate may be specified in terms of a polar coordinates $(\rho, \varphi)$ in the color wheel. A mapping that encodes a set of data symbols may be constructed by choosing colors from the plane slice. According to an embodiment, a mapping that encodes a set of five data symbols may be constructed by selecting five corresponding colors from the plane slice 1600. In this example, the selected colors may include orange 1602, yellow 1604, green 1606, blue 1608, and indigo 1610.

FIG. 17 illustrates a mapping 1700 between optical frequencies and data symbols that encodes five data symbols, according to an embodiment. In this example, the mapping 1700 associates each of five frequencies (colors) with a corresponding data symbol. For example, a first data symbol 1702, having a value "0" may be associated with a first frequency 1602 corresponding to the color orange. A second data symbol 1704, having a value "1" may be associated with a second frequency 1604 corresponding to the color yellow. A third symbol 1706, having a value "2" may be associated with a third frequency 1606 corresponding to the color green. A fourth symbol 1708, having a value "3" may be associated with a fourth frequency 1608 corresponding to the color blue. A fifth symbol 1710, having a value "4" may be associated with a fifth frequency 1610 corresponding to the color indigo. According to an embodiment, a sequence of data symbols may be represented by an optical signal based on the mapping 1700 as described below with reference to FIG. 8.

Figure 18:
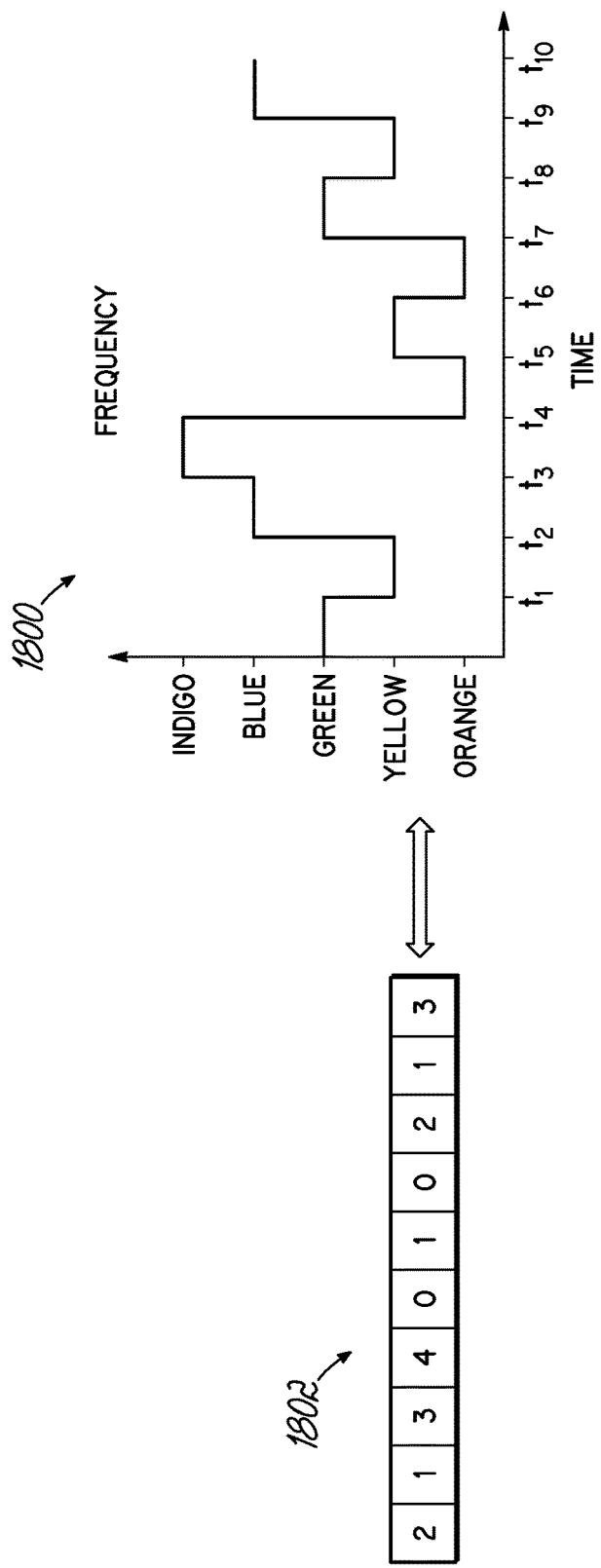
FIG. 18 is schematic illustration of an optical signal that encodes a sequence of data symbols based on the mapping of FIG. 17, according to an embodiment.

FIG. 18 is schematic illustration of an optical signal 1800 that encodes a sequence of data symbols 1802 based on the mapping 1700 of FIG. 17, according to an embodiment. In this example, the sequence of data symbols 1802 is given by the set of values {2, 1, 3, 4, 0, 1, 0, 2, 1, 3}. According to an embodiment, the sequence of data symbols 1802 may be encoded as the optical signal 1800 by associating a frequency (or color) with each data symbol as determined by the mapping 1700 of FIG. 17. Thus, the mapping 1700 of FIG. 17 associates the sequence of data symbols 1802 given by {2, 1, 3, 4, 0, 1, 0, 2, 1, 3} with the corresponding sequence of frequencies (i.e., colors) {green, yellow, blue, indigo, orange, yellow, orange, green, yellow, blue}. According to an embodiment, an optical signal may be generated as a frequency modulated optical signal comprising the plurality of optical frequencies, each frequency lasting for a predetermined time duration, wherein the sequence of frequencies in the optical signal corresponds to the sequence of data symbols as defined by the mapping, as follows.

The optical signal 1800 may be generated to include each color of the sequence {green, yellow, blue, indigo, orange, yellow, orange, green, yellow, blue} for a predetermined time duration. For example, the optical signal 1800 includes the color green that is generated and transmitted during the time interval from 0 to $t_1$, the color yellow from $t_1$ to $t_2$, and the color blue from $t_2$ to $t_3$. As illustrated, the signal continues as: indigo from $t_3$ to $t_4$, orange from $t_4$ to $t_5$, yellow from $t_5$ to $t_6$, orange from $t_6$ to $t_7$, green from $t_7$ to $t_8$, yellow from $t_8$ to $t_9$, and blue from $t_9$ to $t_{10}$. In some embodiments, each color may be refined by subtracting a white background component. In further embodiments, the optical signal 1800 may be received by an optical receiver to generate an electrical signal that is provided to a processor. The processor may then decode the sequence of data symbols 1802 from the received optical signal 1800.

The mappings 1400 and 1700 of FIGS. 14 and 17, respectively, provide simple examples of mappings between colors and data symbols. Many more mappings may be constructed as would be readily apparent to persons of ordinary skill in the art. For example, a red-green-blue (RGB) light emitting diode (LED) may be used as the optical signal generator. An RGB LED may represent each of the primary colors—red, green, and blue—using 8 data bits. Each bit may take on any integer value between 0 and 255. Thus, colors may be mixed with each color taking on any of 256 intensity values. Thus, an RGB LED may generate a total of 256*256*256=16,777,216 different colors. Thus, in principle, a mapping between data symbols and colors may encode a total of 16,777,216 data symbols.

In practice, a suitable mapping may be generated using far fewer colors than the total of 16,777,216 available colors. For example, the set of ASCII control characters includes 256 data symbols, the set of printable ASCII characters includes 256 characters, and the ASCII extended character set includes 256 characters. Therefore, according to an embodiment, the complete ASCII character set may be encoded using as few as 3*256=768 colors. Thus, a wide variety of mappings may be generated as needed for a given application. In certain applications, only a simple mapping such as the mapping 1400 of FIG. 14 or the mapping 1700 of FIG. 17 may be needed. For example, a short sequence of integers may be used as common passkeys used for Bluetooth™ pairing. For example, the sequences "0000" and "1234" are commonly used as default Bluetooth™ passkeys. In this example, the mapping 1700 of FIG. 17 may be sufficient to represent such simple sequences of data symbols.

The example optical signals 1500 (see FIG. 15) and 1800 (see FIG. 18), presented above, exhibit sharp transitions between frequencies at times $t_1, t_2, \ldots t_{10}$. Such transitions from one frequency to another in the optical signal may be used by the optical receiver to determine a clock cycle associated with the optical signal. For example, the time differences $d_1=t_1-0$, $d_2=t_2-t_1$, etc. may be used to define a clock cycle. A sequence including one or more repeated data symbols may then be correctly decoded once a clock cycle has been determined.

For example, an optical signal corresponding to the sequence "1234" may have frequency transitions between frequencies corresponding to data symbols 1, 2, 3, and 4, respectively. Using the determined clock cycle allows a sequence such as "0000" to be detected. For example, the sequence "0000" may be represented by a portion of an optical signal having a single frequency (e.g. red according to mapping 1400 or orange according to mapping 1700) that lasts for a time duration equal to four times the time associated with the determined clock cycle. In further embodiments, additional symbols may be used to denote transitions between symbols. In such embodiments, each of the repeated symbols in the sequence "0000" may be separated by transition symbols.

In further embodiments, data symbols may be represented by frequency differences. For example, the frequency difference between green and yellow that occurs at time $t_1$ may be used to encode a first data symbol. Similarly, the frequency difference between yellow and blue that occurs at time $t_2$ may be used to encode a second data symbol, etc.

According to an embodiment, sequences of data symbols may be organized into a plurality of data packets. For example, a data packet may include seven symbols per data packet. Other embodiments may have data packets that contain other numbers of symbols. According to an embodiment, a data packet may last for a predetermined time of one second. In other embodiments data packets may last for other time durations. Data packets may be distinguished from one another by a predetermined sequence of symbols. For example, each data packet may start or end with a pair of repeated symbols. In some embodiments, a particular data value (i.e., a specific data symbol) may be used to ensure that a particular data packet has been properly transmitted and received. According to an embodiment, a data packet may include five data symbols followed by a repeated symbol that is used for packet synchronization for a total of seven symbols.

In certain embodiments, the presence of a repeated symbol enables synchronization of packets. In some embodiments, a data packet may be repeated a predetermined number of times so that it may be properly distinguished. In one embodiment, a predetermined sequence of colors representing a data packet may be repeated, each time starting from a different color. In one embodiment, a block of data may include four data packets, each data packet containing seven data symbols with each data packet repeated five times for a total of 4*7*5=140 data symbols in a data block. In other embodiments, sequences of data symbols may be organized in any other convenient format, as would be readily apparent to persons of ordinary skill in the art.

According to an embodiment, an optical receiver may be configured to receive the optical signal and to distinguish various colors contained in the optical signal. For example, if an RGB LED is used to generate the signal, each color may be considered to be a mixture of red, green, and blue with each color being characterized by an 8-bit intensity value in the range from 0-255. The optical receiver may be configured to determine the corresponding intensity values to give a three dimensional coordinate (r, g, b) in a three dimensional color space, wherein r, g, and b, represent the intensity values of the red, green, and blue colors, respectively, in the mixture.

As described above, a mapping between colors and data symbols (such as mapping 1400 of FIG. 14 and mapping 1700 of FIG. 17) is based on a specific set of colors that are associated with a corresponding set of data symbols. For example, the mapping may be a two-dimensional slice 1600 through the three-dimensional color space, such as illustrated schematically in FIG. 16. Thus, the colors used for the mapping may be represented as coordinates in a two-dimensional space. For example, a color may be represented in terms of polar coordinates ($\rho$, $\varphi$) that specify a radial distance and angle in the two-dimensional space. According to an embodiment, a K-means machine learning algorithm may be used to determine the two-dimensional coordinates ($\rho$, $\varphi$) from the detected three-dimensional (r, g, b) coordinates. Once the two-dimensional coordinates have been determined, the corresponding sequence of symbols may be decoded by the receiving device based on the mapping (e.g., based on a mapping such as 1400 of FIG. 14 or 1700 of FIG. 17).

According to an embodiment, a data packet may include error correction code. For example, a symbol may be used to represent a parity sum on the first five bits in a data packet. If the parity sum is correct then the data packet is considered to be correct. It is possible to implement error correction if the parity sum deviates from the expected sum by a value of unity. For example, if a color is seen to repeat in the data portion of a data packet it can be recognized as an error because in certain embodiments colors may be chosen by convention to not repeat in the data portion.

According to an embodiment, as mentioned above, frequency differences between colors in the optical signal may be used to represent data symbols. In such an embodiment based on frequency differences, for example, five colors may be used to represent four data symbols based on frequency differences. Thus, if there is a repeated color in the data portion and the parity sum is 1 then the repeated colors can be corrected (e.g., the second of the repeated color can be corrected by changing it according to the value of the parity sum, that is, if the parity sum is 1, then the second of the repeated colors should be changed by 1 according to the chosen mapping).

Figure 19:
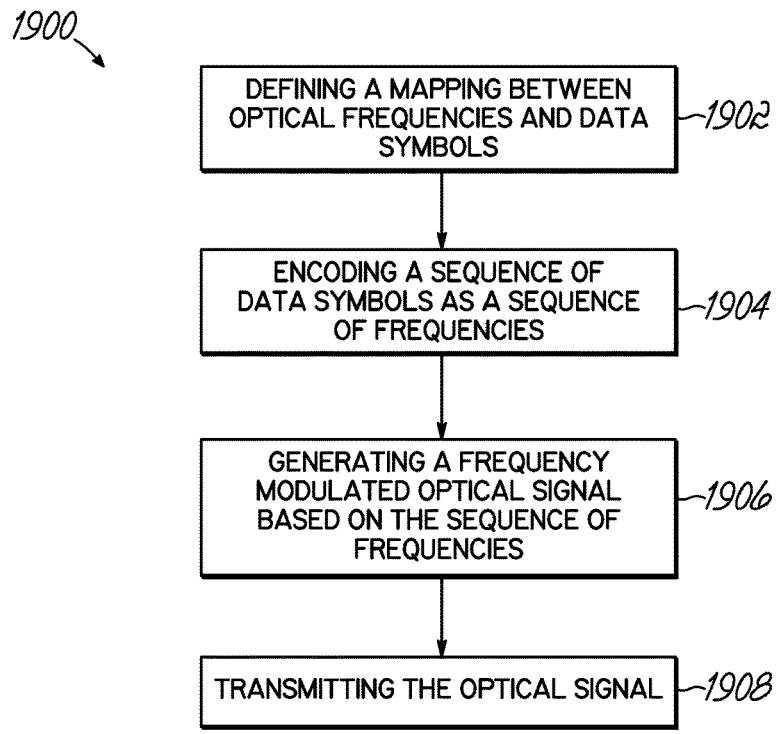
FIG. 19 is a flowchart illustrating a processor based method of transmitting data encoded as an optical signal, according to an embodiment.

FIG. 19 is a flowchart 1900 illustrating a processor based method of transmitting data encoded as an optical signal, according to an embodiment. In a first stage 1902, the method includes defining a mapping between optical frequencies and data symbols. Example mappings were discussed above with reference to FIGS. 4 and 7. Many further mappings may also be generated, as would be readily apparent to persons of ordinary skill in the art. In a second stage 1904, the method includes encoding, by a processor on a first device, a sequence of data symbols as an optical signal based on the mapping, wherein the encoding involves identifying a sequence of optical frequencies corresponding to the sequence of data symbols based on the mapping. In some embodiments, the sequence of data symbols may represent a security authentication code that may be used to establish a secure data transfer connection between the first device and a second device. In other embodiments, the sequence of data symbols may represent an encrypted or unencrypted message.

In a further stage 1906, the method includes generating an optical signal based on the encoding. As described above, the optical signal may be generated as a frequency modulated optical signal including the plurality of optical frequencies, with each frequency lasting for a predetermined time duration, wherein the sequence of frequencies in the optical signal corresponds to the sequence of data symbols as defined by the encoding. In a further stage 1908, the method includes transmitting the optical signal to the second device. In some embodiments, the sequence of data symbols may be encoded based on differences between frequencies in the frequency modulated optical signal. As described above, the sequence of data symbols may be encoded to include symbols that provide for synchronization of data packets. In further embodiments, the sequence of data symbols may be encoded based on a mapping that associates an angular coordinate with a color in a two-dimensional color space.

As described above with reference to FIGS. 2 and 3, in some embodiments, one of the two devices may be an integrated solar panel having a controller. In such embodiments, the sequence of data symbols may be encoded to represent control data that is used by the controller to control the integrated solar panel and/or status data that reports operating conditions of the integrated solar panel. In further embodiments, the sequence of data symbols may represent a security authentication code that may be used to establish a secure data transfer connection between the integrated solar panel and an external device.

Figure 20:
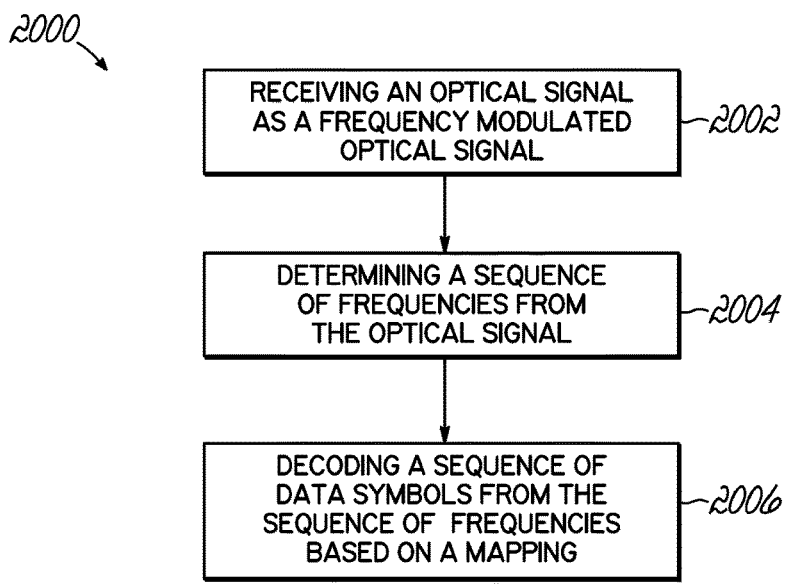
FIG. 20 is a flowchart illustrating a processor based method of receiving data encoded as an optical signal, according to an embodiment.

FIG. 20 is a flowchart 2000 illustrating a processor based method of receiving data encoded as an optical signal, according to an embodiment. In a first stage 2002 the method includes receiving an optical signal at a first device. As described above, the optical signal may be a frequency modulated optical signal including a time dependent sequence of optical frequency components with each frequency lasting for a predetermined time duration. In a second stage 2004, the method includes using a processor on the first device to determine a sequence of frequencies that are included in the received signal. In a third stage 2006, the method includes decoding a sequence of data symbols corresponding to the determined sequence of symbols based on a mapping between optical frequencies and data symbols.

In some embodiments, the sequence of data symbols may represent a security authentication code that may be used to establish a secure data transfer connection between the first device and a second device. In other embodiments, the sequence of data symbols may represent an encrypted or unencrypted message. In some embodiments, the sequence of data symbols may be decoded based on differences between frequencies in the frequency modulated optical signal. As described above, the sequence of data symbols may be decoded to determine symbols that provide for synchronization of data packets. In further embodiments, the sequence of data symbols may be decoded based on a mapping that associates an angular coordinate with a color in a two-dimensional color space.

Figure 21:
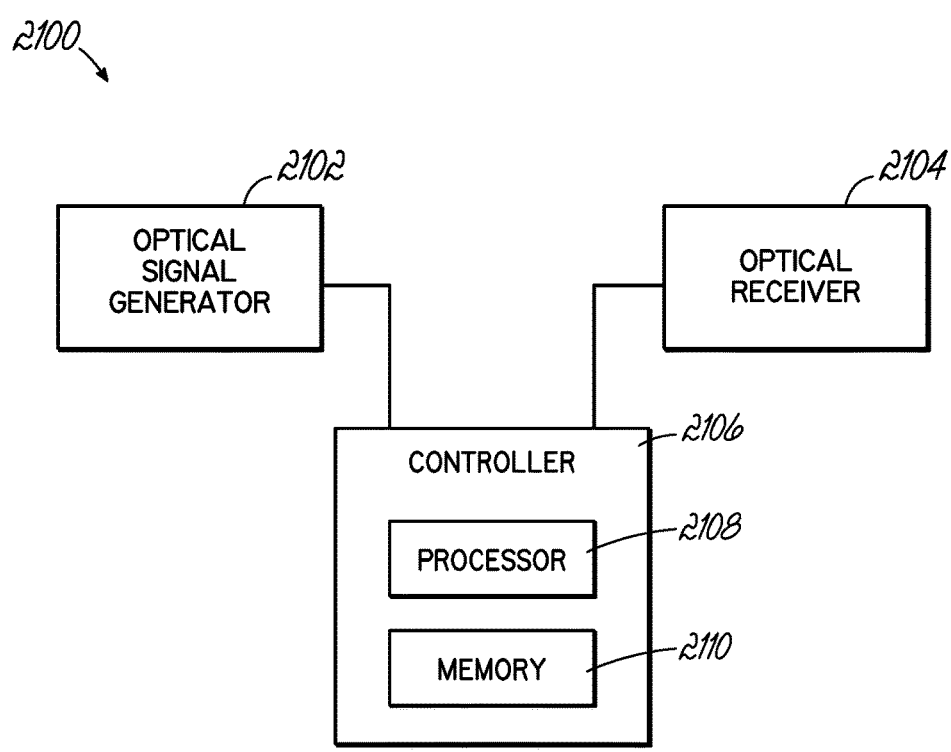
FIG. 21 is a block diagram of an example system that is configured to transmit and receive data encoded as optical signals, according to an embodiment.

As described above the sequence of data symbols may be encoded to represent control data that is used by the controller of an integrated solar panel to control the integrated solar panel. In further embodiments the sequence of data symbols may be encoded to represent status data that reports operating conditions of the integrated solar panel. In further embodiments, the sequence of data symbols may represent a security authentication code that may be used to establish a secure data transfer connection between the integrated solar panel and an external device FIG. 21 is a block diagram of an example system 2100 that is configured to transmit and receive data encoded as optical signals, according to an embodiment. The system includes an optical signal generator 2102, an optical receiver 2104, and a controller 2106. The controller 2106 further includes at least one processor 2108 and a memory 2110. The memory may be a non-transitory computer readable storage device having computer program instructions stored thereon that, when executed by the processor 2108, cause the processor to perform operations of the above described methods of transmitting and receiving data encoded as optical signals. System 2100 may be configured to operate as a transmitting and/or receiving system.

According to an embodiment, when operating as a transmitting system, the processor 2108 on a first device encodes a sequence of data symbols as an optical signal that may represent a security authentication code that establishes a secure data transfer connection between the first device and a second device. The optical signal generator 2102 on the first device then generates the optical signal and transmits it to the second device. When operating as a receiving system, the optical receiver 2104 on the second device receives an optical signal. The processor 2108 on the second device decodes sequential data symbols from the optical signal and determines that the sequence of data symbols represents a security authentication code that establishes a secure data transfer connection between the first device and the second device. Embodiments of the controller 2106 may be implemented as hardware, firmware, or software, as described below in greater detail with reference to FIG. 12.

Figure 22:
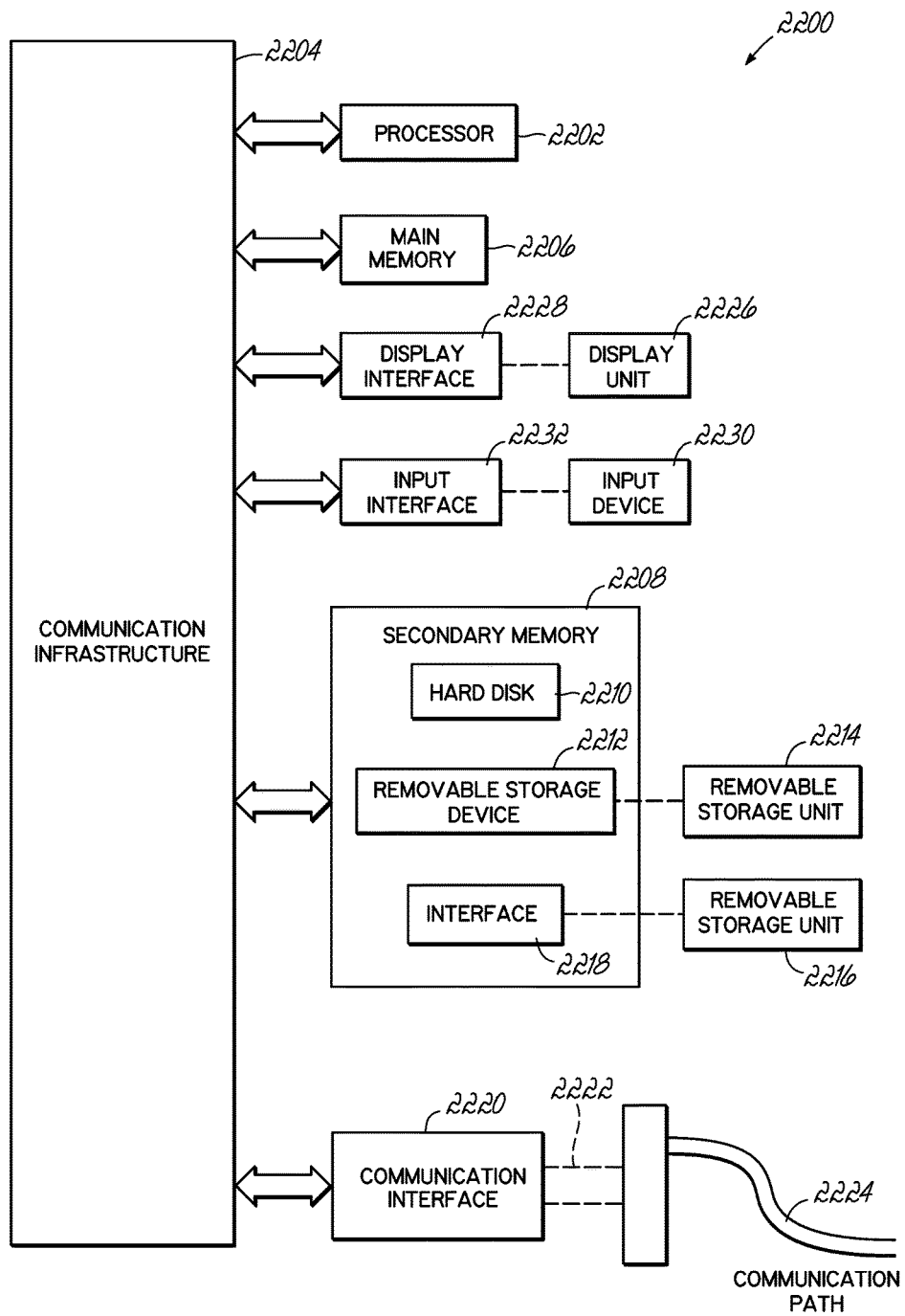
FIG. 22 is a block diagram of an example computer system in which embodiments of the disclosed invention, or portions thereof, may be implemented as computer-readable code, which is executed by one or more processors causing the one or more processors to perform operations of the disclosed invention, according to an embodiment.

FIG. 22 is a block diagram of an example computer system 2200 in which embodiments of the disclosed invention, or portions thereof (e.g., the controller 2106 of FIG. 21), may be implemented as computer-readable code, which is executed by one or more processors causing the one or more processors to perform operations of the disclosed invention, according to an embodiment.

For example, systems 100 (see FIG. 1), 200 (see FIG. 2), 300 (see FIG. 3), and 1100 (see FIG. 11) may be implemented on computer system 2200 using hardware, software, firmware, tangible computer readable media having instructions stored thereon, or a combination thereof and may be implemented in one or more computer systems or other processing system.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

Various embodiments of the invention are described in terms of this example computer system 2200. After reading this description, it will become apparent to persons of ordinary skill in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

As will be appreciated by persons of ordinary skill in the relevant art, a computing device for implementing the disclosed invention has at least one processor, such as processor 2202, wherein the processor may be a single processor, a plurality of processors, a processor in a multi-core/multiprocessor system, such system operating alone, or in a cluster of computing devices operating in a cluster or server farm. Processor 2202 may be connected to a communication infrastructure 2204, for example, a bus, message queue, network, or multi-core message-passing scheme.

Computer system 2200 may also include a main memory 2206, for example, random access memory (RAM), and may also include a secondary memory 2208. Secondary memory 2208 may include, for example, a hard disk drive 2210, removable storage drive 2212. Removable storage drive 2212 may include a floppy disk drive, a magnetic tape drive, an optical disk drive, a flash memory, or the like. The removable storage drive 2212 may be configured to read and/or write data to a removable storage unit 2214 in a well-known manner. Removable storage unit 2214 may include a floppy disk, magnetic tape, optical disk, etc., which is read by and written to, by removable storage drive 2212. As will be appreciated by persons of ordinary skill in the relevant art, removable storage unit 2214 may include a computer readable storage medium having computer software (i.e., computer program instructions) and/or data stored thereon.

In alternative implementations, secondary memory 2208 may include other similar devices for allowing computer programs or other instructions to be loaded into computer system 2200. Such devices may include, for example, a removable storage unit 2216 and an interface 2218. Examples of such devices may include a program cartridge and cartridge interface (such as that found in video game devices), a removable memory chip (such as EPROM or PROM) and associated socket, and other removable storage units 2216 and interfaces 2218 which allow software and data to be transferred from the removable storage unit 2216 to computer system 2200.

Computer system 2200 may also include a communications interface 2220. Communications interface 2220 allows software and data to be transferred between computer system 2200 and external devices. Communications interfaces 2220 may include a modem, a network interface (such as an Ethernet card), a communications port, a PCMCIA slot and card, or the like. Software and data transferred via communications interface 2220 may be in the form of signals 2222, which may be electronic, electromagnetic, optical, or other signals capable of being received by communications interface 2220. These signals may be provided to communications interface 2220 via a communications path 2224.

In this document, the terms "computer program storage medium" and "computer usable storage medium" are used to generally refer to storage media such as removable storage unit 2214, removable storage unit 2216, and a hard disk installed in hard disk drive 2210. Computer program storage medium and computer usable storage medium may also refer to memories, such as main memory 2206 and secondary memory 2208, which may be semiconductor memories (e.g., DRAMS, etc.). Computer system 2200 may further include a display unit 2226 that interacts with communication infrastructure 2204 via a display interface 2228. Computer system 2200 may further include a user input device 2230 that interacts with communication infrastructure 2204 via an input interface 2232. A user input device 2230 may include a mouse, trackball, touch screen, or the like.

Computer programs (also called computer control logic or computer program instructions) are stored in main memory 2206 and/or secondary memory 2208. Computer programs may also be received via communications interface 2220. Such computer programs, when executed, enable computer system 2200 to implement embodiments as discussed herein. In particular, the computer programs, when executed, enable processor 2202 to implement the processes of embodiments of the invention, such as the stages in the methods illustrated by flowchart 1900 of FIG. 19 and flowchart 2000 of FIG. 20, discussed above. Accordingly, such computer programs represent controllers of the computer system 2200. When an embodiment is implemented using software, the software may be stored in a computer program product and loaded into computer system 2200 using removable storage drive 2212, interface 2218, and hard disk drive 2210, or communications interface 2220.

Embodiments may be implemented using software, hardware, and/or operating system implementations other than those described herein. Any software, hardware, and operating system implementations suitable for performing the functions described herein can be utilized. Embodiments are applicable to both a client and to a server or a combination of both.

CONCLUSION

The Summary and Abstract sections may set forth one or more but not all example embodiments and thus are not intended to limit the scope of embodiments of the invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the invention that others can, by applying knowledge of those of ordinary skill in the art, readily modify and/or adapt for various applications such specific embodiments, without undue experimentation, without departing from the general concept of embodiments of the invention. Therefore, such adaptation and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the invention should not be limited by any of the above-described example embodiments, but should be defined only in accordance with the following claims and their equivalents.

What is claimed is:

1. A processor based method of transmitting data encoded within a modulation pattern of an optical signal carrier, the method comprising:
encoding, by a processor on a first device, a sequence of data symbols as a set of rules for modulation of components of an optical signal, wherein the sequence of data symbols includes symbols that represent a security authentication code that establishes a secure data transfer connection between the first device and a second device;
generating the optical signal modulation pattern and transmitting a corresponding modulated optical signal, based on the set of rules, to the second device,
wherein one of the first and second devices is an integrated solar panel having a controller;
encoding the sequence of data symbols by mapping a plurality of data symbols from the sequence to a corresponding plurality of modulation state transitions of the modulated optical signal
generating and transmitting the optical signal as an optical signal containing a plurality of frequency elements that are each modulated in intensity, with each combination of intensities lasting for a predetermined time duration,
wherein the set of rules defines a mapping of data symbols to permutation rules, and wherein the state transitions in the optical signal between each combination of intensities correspond to permutations of the data symbol sequence as defined by the set of rules; and
selecting sets of data symbols and permutation rules, such that a super-pattern containing multiple packets, including a repeated packet, iterates evenly through the space of possible sets of light frequencies and intensities over a defined time duration.

2. The method of claim 1, further comprising:
encoding the sequence of data symbols based on a mapping that associates indexes for an ordered list of the symbols with linear transformations applied to a vector within an n-dimensional space of frequencies and intensities.

3. The method of claim 2, further comprising:
encoding the sequence of data symbols such that the set of linear transformations from the first device are distributed to maximize the distance between the outcome of corresponding linear transformations in the n-dimensional space representing the set of frequency response curves and intensities that can be sensed by the second device.

4. A system that transmits data encoded within a modulation pattern of an optical signal carrier, the system comprising:
a processor on a first device that encodes a sequence of data symbols as a set of rules for modulation of components of an optical signal, wherein the sequence of data symbols includes symbols that represent a security authentication code that establishes a secure data transfer connection between the first device and a second device; and
an optical signal generator on the first device that generates the optical signal modulation pattern and transmits a corresponding modulated optical signal, based on the set of rules, to the second device,
wherein one of the first and second devices is an integrated solar panel having a controller,
wherein:
the processor is further configured to encode the sequence of data symbols by mapping a plurality of data symbols from the sequence to a corresponding plurality of modulation state transitions of the modulated optical signal; and
the optical signal generator is further configured to generate and transmit the optical signal as an optical signal containing a plurality of frequency elements that are each modulated in intensity, with each combination of intensities lasting for a predetermined time duration,
wherein the set of rules defines a mapping of data symbols to permutation rules,
wherein the state transitions in the optical signal between each combination of intensities correspond to permutations of the data symbol sequence as defined by the set of rules; and
wherein the processor is further configured to:
select sets of data symbols and permutation rules, such that a super-pattern containing multiple packets, including a repeated packet, iterates evenly through the space of possible sets of light frequencies and intensities over a defined time duration.

5. A system that transmits data encoded within a modulation pattern of an optical signal carrier, the system comprising:
a processor on a first device that encodes a sequence of data symbols as a set of rules for modulation of components of an optical signal, wherein the sequence of data symbols includes symbols that represent a security authentication code that establishes a secure data transfer connection between the first device and a second device; and
an optical signal generator on the first device that generates the optical signal modulation pattern and transmits a corresponding modulated optical signal, based on the set of rules, to the second device,
wherein one of the first and second devices is an integrated solar panel having a controller, wherein:
the processor is further configured to encode the sequence of data symbols by mapping a plurality of data symbols from the sequence to a corresponding plurality of modulation state transitions of the modulated optical signal; and
the optical signal generator is further configured to generate and transmit the optical signal as an optical signal containing a plurality of frequency elements that are each modulated in intensity, with each combination of intensities lasting for a predetermined time duration,
wherein the set of rules defines a mapping of data symbols to permutation rules,
wherein the state transitions in the optical signal between each combination of intensities correspond to permutations of the data symbol sequence as defined by the set of rules; and
wherein the processor is further configured to:
encode the sequence of data symbols based on a mapping that associates indexes for an ordered list of the symbols with linear transformations applied to a vector within an n-dimensional space of frequencies and intensities.

6. The system of claim 5, wherein the processor is further configured to:
encode the sequence of data symbols such that the set of linear transformations from the first device are distributed to maximize the distance between the outcome of corresponding linear transformations in the n-dimensional space representing the set of frequency response curves and intensities that can be sensed by the second device.

7. A processor based method of receiving data encoded within a modulation pattern of an optical signal carrier, the method comprising:
receiving an optical signal at a first device;
decoding, by a processor at the first device, a sequence of data symbols from the optical signal; and
determining that the sequence of symbols represents a security authentication code that establishes a secure data transfer connection between the first device and a second device, wherein one of the two devices is an integrated solar panel having a controller;
receiving the optical signal as an optical signal containing a plurality of frequency elements that are each modulated in intensity, with each combination of intensities lasting for a predetermined time duration;
determining that state transitions in the optical signal between each combination of intensities correspond to permutations of the data symbol sequence as defined by a mapping of data symbols to permutation rules;
decoding the sequence of data symbols by mapping a plurality of modulation state transitions in light output to a corresponding plurality of data symbols; and
clustering received linear transformations into a set of representative linear transformations based on a probabilistic combination of their proximity in the n-dimensional space and their frequency of occurrence within a previous defined sampling time for identifying the population of state transitions.

8. The method of claim 7, further comprising:
updating a probabilistic calculation for both new and previously received linear transformations to include the population of newer linear transformations and to exclude linear transformations older than a defined threshold.

9. The method of claim 7, further comprising:
decoding the sequence of data symbols such that the set of linear transformations from the first device are distributed to maximize the distance between the outcome of corresponding linear transformations in the n-dimensional space representing the set of frequency response curves and intensities that can be sensed by the second device.

10. A system that receives data encoded as an optical signal, the system comprising:
an optical receiver on a first device that receives an optical signal; and
a processor on the first device that decodes a sequence of data symbols from the optical signal and determines that the sequence of data symbols represents a security authentication code that establishes a secure data transfer connection between the first device and a second device;
wherein one of the two devices is an integrated solar panel having a controller;
wherein:
the optical receiver is further configured to receive the optical signal as an optical signal containing a plurality of frequency elements that are each modulated in intensity, with each combination of intensities lasting for a predetermined time duration,
the processor is further configured to:
determine that state transitions in the optical signal between each combination of intensities correspond to permutations of the data symbol sequence as defined by a mapping of data symbols to permutation rules; and
decode the sequence of data symbols by mapping a plurality of modulation state transitions in light output to a corresponding plurality of data symbols;
wherein the processor is further configured to:
cluster received linear transformations into a set of representative linear transformations based on a probabilistic combination of their proximity in the n-dimensional space and their frequency of occurrence within a previous defined sampling time for identifying the population of state transitions.

11. A system that receives data encoded as an optical signal, the system comprising:
an optical receiver on a first device that receives an optical signal; and
a processor on the first device that decodes a sequence of data symbols from the optical signal and determines that the sequence of data symbols represents a security authentication code that establishes a secure data transfer connection between the first device and a second device;
wherein one of the two devices is an integrated solar panel having a controller;
wherein:
the optical receiver is further configured to receive the optical signal as an optical signal containing a plurality of frequency elements that are each modulated in intensity, with each combination of intensities lasting for a predetermined time duration,
the processor is further configured to:
determine that state transitions in the optical signal between each combination of intensities correspond to permutations of the data symbol sequence as defined by a mapping of data symbols to permutation rules; and decode the sequence of data symbols by mapping a plurality of modulation state transitions in light output to a corresponding plurality of data symbols;

wherein the processor is further configured to:

update a probabilistic calculation for both new and previously received linear transformations to include the population of newer linear transformations and to exclude linear transformations older than a defined threshold.

12. The system of claim 11, wherein the processor is further configured to:

decode the sequence of data symbols such that the set of linear transformations from the first device are distributed to maximize the distance between the outcome of corresponding linear transformations in the n-dimensional space representing the set of frequency response curves and intensities that can be sensed by the second device.

* * * * *